United States Patent [19]
Beckett et al.

[11] Patent Number: 6,007,230
[45] Date of Patent: Dec. 28, 1999

[54] ENGRAVING SYSTEM AND METHOD WITH ARBITRARY TOOLPATH CONTROL

[75] Inventors: Tony D. Beckett, Dayton; Mark Burns, Fairborn; Neal Clements, Mt. Orab; Louis Jacques Duchesneau, Centerville; John W. Fraser; Kenneth W. Jackson, both of Dayton, all of Ohio

[73] Assignee: Ohio Electronic Engravers, Inc., Dayton, Ohio

[21] Appl. No.: 08/865,733

[22] Filed: May 30, 1997

Related U.S. Application Data

[63] Continuation-in-part of application No. 08/434,592, May 4, 1995, Pat. No. 5,663,803.

[51] Int. Cl.$^6$ .................................................. G06F 19/00
[52] U.S. Cl. .............................. 364/474.02; 364/474.28; 364/474.32
[58] Field of Search ..................... 364/474.02, 474.28, 364/474.32; 358/298, 297

[56] References Cited

U.S. PATENT DOCUMENTS

| Re. 23,914 | 12/1954 | Boyajean | 178/6.6 |
|---|---|---|---|
| 2,112,010 | 3/1938 | Brimberg | 178/6.6 |

(List continued on next page.)

OTHER PUBLICATIONS

"Datwyler," MDC Max Datwyler Corp., USA, 13420 West Reese Blvd., Huntersville, NC 28078, undated brochure.
"Polishmaster Junior High–Precision Machining and Measuring Center for Rotogravure Cylinders," MDC Max Datwyler AG, CH–3368 Bleienback/Schweiz, Switzerland, undated brochure.
"Finishmaster Unit for Polishing of Rotogravure Cylinders After Copper or Chrome Plating," MDC Max Datwyler AG, CH–3368 Bleienbach/Schweiz, Switzerland, undated brochure.
"Cr–Master Type E Plating Tanks for the Chrome–Plating of Rotogravure Cylinders," MDC Max Datwyler AG, CH–3368 Bleienbach/Schweiz, Switzerland, undated brochure.
Twin–Pilot, Maschinenfabrik Kasper Walter GmbH & Co., KG, Plinganserstrasse 22, 8000 Munchen 70, Germany, undated brochure.
JAV. "Getting Better Acciracy with Non–Precision Ball Screws," American Machinist, Feb. 1993, pp. 50–51.
Signal Processing Algorithms Using Fortran and C, Samuel D. Sterns and Ruth A. David, Prentice Hall: Englewood Cliffs, NJ, 1993, p. 103.
System Identification and Control Design Using P.I.M. + Software, Ioan Dore Landau, Prentice Hall: Englewood Cliffs, NJ, 1990, p. 134.

(List continued on next page.)

*Primary Examiner*—Paul P. Gordon
*Attorney, Agent, or Firm*—Jacox, Meckstroth & Jenkins

[57] ABSTRACT

The invention is characterized in that it comprises a toolpath generating routine and system for generating a plurality of control points directly from image data representing an image to be engraved. The control points are used to generate a toolpath which, in turn, will be used to energize an engraving head such that a tool or stylus will engrave a pattern of engraved areas in response to the toolpath. An engraving system and method for engraving at least one engraved area is shown having an engraving head tuner for tuning an engraving head such that the frequency characteristic of the engraving head defines a substantially constant gain for frequencies less than a predetermined frequency. The invention is further characterized in that it incudes a system and method for interactively or automatically tuning the engraving head, interactively adjusting the filter characteristics (including the filter coefficients for the filters used on the engraving head) and for being responsive to the type of image data (whether continuous tone data or linework data). The invention is characterized in that it synthesizes the screening function so as to more accurately reproduce the image to be engraved by engraving multiple frequency cells where single cells would be engraved in the past.

50 Claims, 17 Drawing Sheets

U.S. PATENT DOCUMENTS

| | | | |
|---|---|---|---|
| 2,160,951 | 6/1939 | Alice | 178/13 |
| 2,164,209 | 6/1939 | Howey et al. | 178/5.6 |
| 2,441,651 | 5/1948 | Thompson | 179/100.4 |
| 2,925,464 | 2/1960 | Raible | 178/6.6 |
| 3,280,252 | 10/1966 | Lilien et al. | 178/6 |
| 3,612,753 | 10/1971 | Korman | 178/5.2 A |
| 3,769,455 | 10/1973 | de Vos et al. | 178/6.6 B |
| 3,770,888 | 11/1973 | de Vos et al. | 178/6.6 B |
| 3,784,739 | 1/1974 | de Vos et al. | 178/6.6 B |
| 4,007,362 | 2/1977 | Sindermann | 235/151 |
| 4,079,235 | 3/1978 | Froyd et al. | 364/107 |
| 4,126,821 | 11/1978 | Cannon | 318/696 |
| 4,189,752 | 2/1980 | Moe et al. | 358/298 |
| 4,245,260 | 1/1981 | Doelves | 358/299 |
| 4,342,052 | 7/1982 | Rackley et al. | 358/287 |
| 4,347,785 | 9/1982 | Chase et al. | 101/0 |
| 4,357,633 | 11/1982 | Buechler | 358/299 |
| 4,437,150 | 3/1984 | Dahlgren, Jr. et al. | 364/189 |
| 4,438,460 | 3/1984 | Buechler | 358/299 |
| 4,450,486 | 5/1984 | Buechler | 358/299 |
| 4,451,856 | 5/1984 | Buechler | 358/299 |
| 4,500,929 | 2/1985 | Buechler | 358/299 |
| 4,603,391 | 7/1986 | Inoue et al. | 364/474 |
| 4,678,976 | 7/1987 | Inoue | 318/577 |
| 4,683,500 | 7/1987 | Kitamura et al. | 358/280 |
| 4,688,101 | 8/1987 | Doelves et al. | 358/299 |
| 5,029,011 | 7/1991 | Fraser | 358/299 |
| 5,229,861 | 7/1993 | Nozaka et al. | 358/299 |
| 5,293,426 | 3/1994 | Wouch et al. | 382/1 |
| 5,329,215 | 7/1994 | Fraser et al. | 318/603 |
| 5,402,246 | 3/1995 | Seitz et al. | 358/299 |
| 5,416,597 | 5/1995 | Mubsalat | 358/299 |
| 5,422,958 | 6/1995 | Wouch et al. | 382/141 |
| 5,424,845 | 6/1995 | Holowko et al. | 358/299 |
| 5,424,846 | 6/1995 | Bornhorst, Jr. | 358/299 |
| 5,438,422 | 8/1995 | Holowko et al. | 358/299 |
| 5,440,398 | 8/1995 | Holowko et al. | 358/299 |
| 5,454,306 | 10/1995 | Fraser et al. | 101/28 |
| 5,475,914 | 12/1995 | Bornhorst, Jr. | 29/560 |
| 5,491,559 | 2/1996 | Buechler | 358/299 |
| 5,492,057 | 2/1996 | Bornhorst, Jr. | 101/32 |
| 5,493,939 | 2/1996 | Bornhorst, Jr. | 82/150 |
| 5,519,502 | 5/1996 | Beckett | 358/299 |
| 5,555,473 | 9/1996 | Seitz et al. | 358/299 |
| 5,583,647 | 12/1996 | Izor et al. | 358/299 |
| 5,602,972 | 2/1997 | Hada et al. | 395/112 |
| 5,617,217 | 4/1997 | Brewer et al. | 358/299 |
| 5,621,533 | 4/1997 | Holowko et al. | 358/299 |
| 5,675,420 | 10/1997 | Beckett et al. | 358/299 |
| 5,719,683 | 2/1998 | Yoshida | 358/299 |
| 5,731,881 | 3/1998 | Buechler | 358/299 |
| 5,831,745 | 11/1998 | Ogawa | 358/299 |

OTHER PUBLICATIONS

"Cu–Master Type E Plating Tanks for Copper–Plating of Rotogravure Cylinders," MDC Max Datwyler AG, CH–3368 Bleienbach/Schweiz, Switzerland, undated brochure.

"ADSP–21000 Family: Application Handbook vol. 1," Analog Devices, Inc., 1994, pp. 100–111.

"Numerical Recipes in C: The Art of Scientific Computing," 2nd Edition, authored by Press, Teukolsky, Vetterling and Flannery, 1992, pp. 113–116.

"High Speed Electron Beam Engraving Method or Procedure for Engraving of Metal Cylinders", Wolfgang Boppel, c/o Dr. –Engineering r. Hell GmbH, Development Range or Scope Deep–Pressure Work or Plant 2, GrenzstraBe 2, 2300 Kiel 14, Federal Republic of germany, Optic 77 No. 2 (1987) 83–92 Copyrgiht.

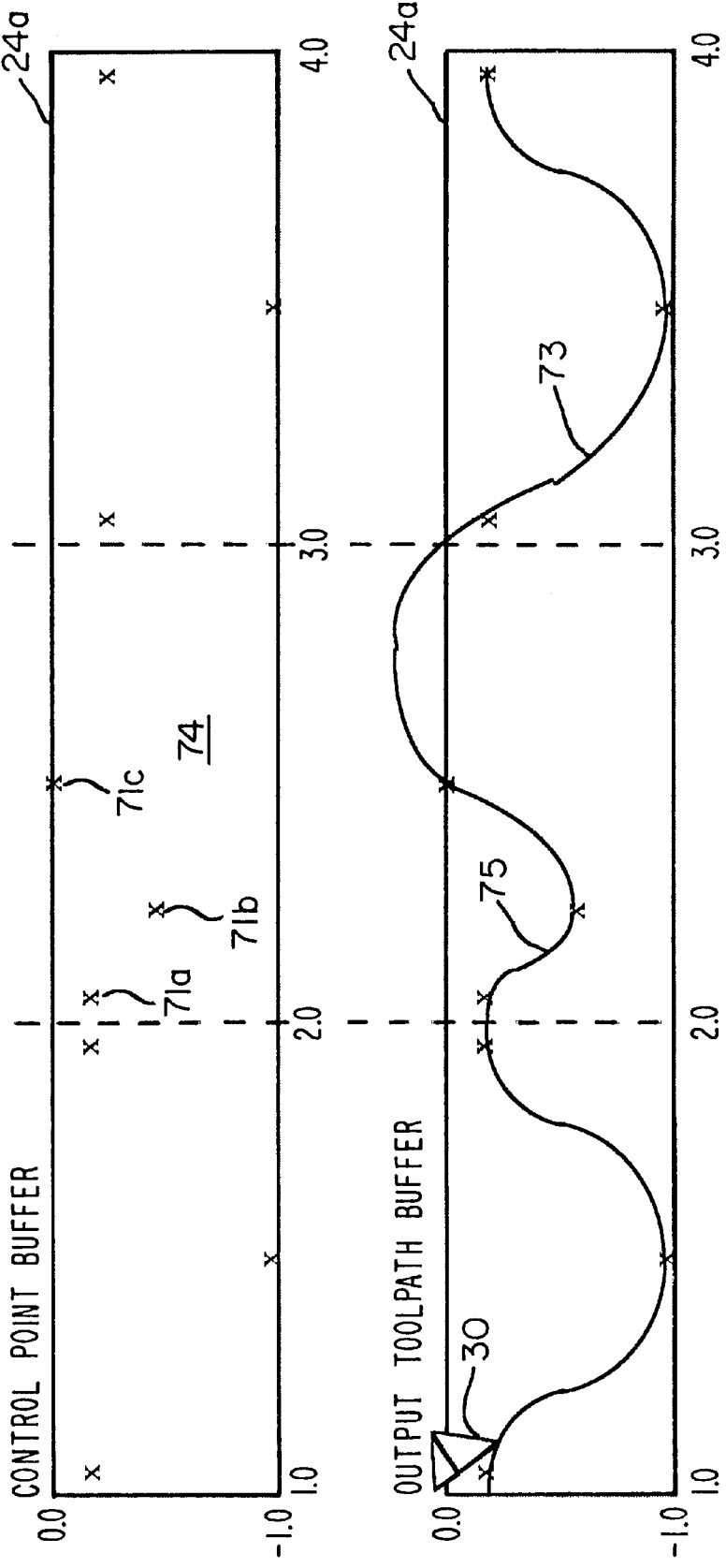

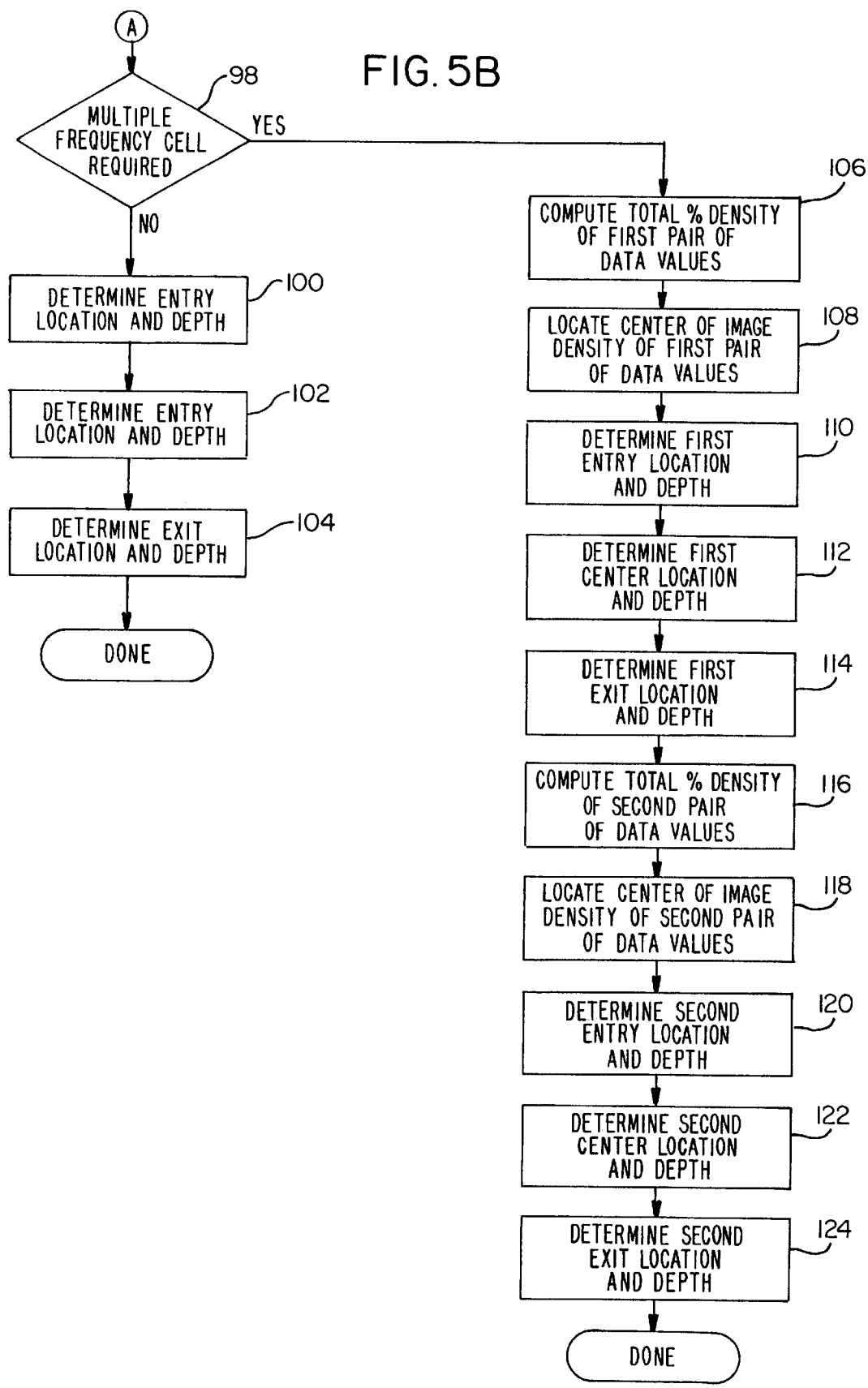

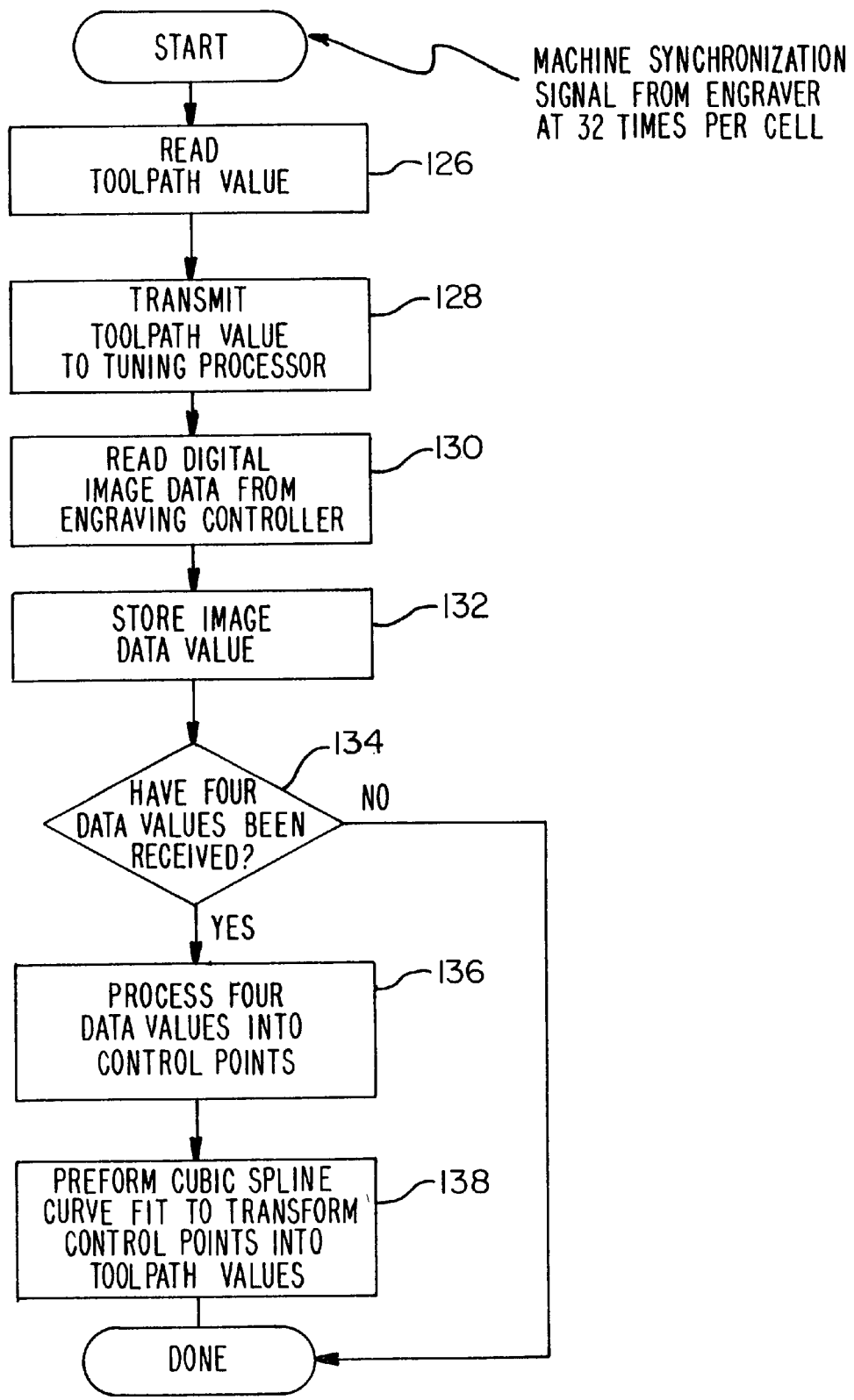

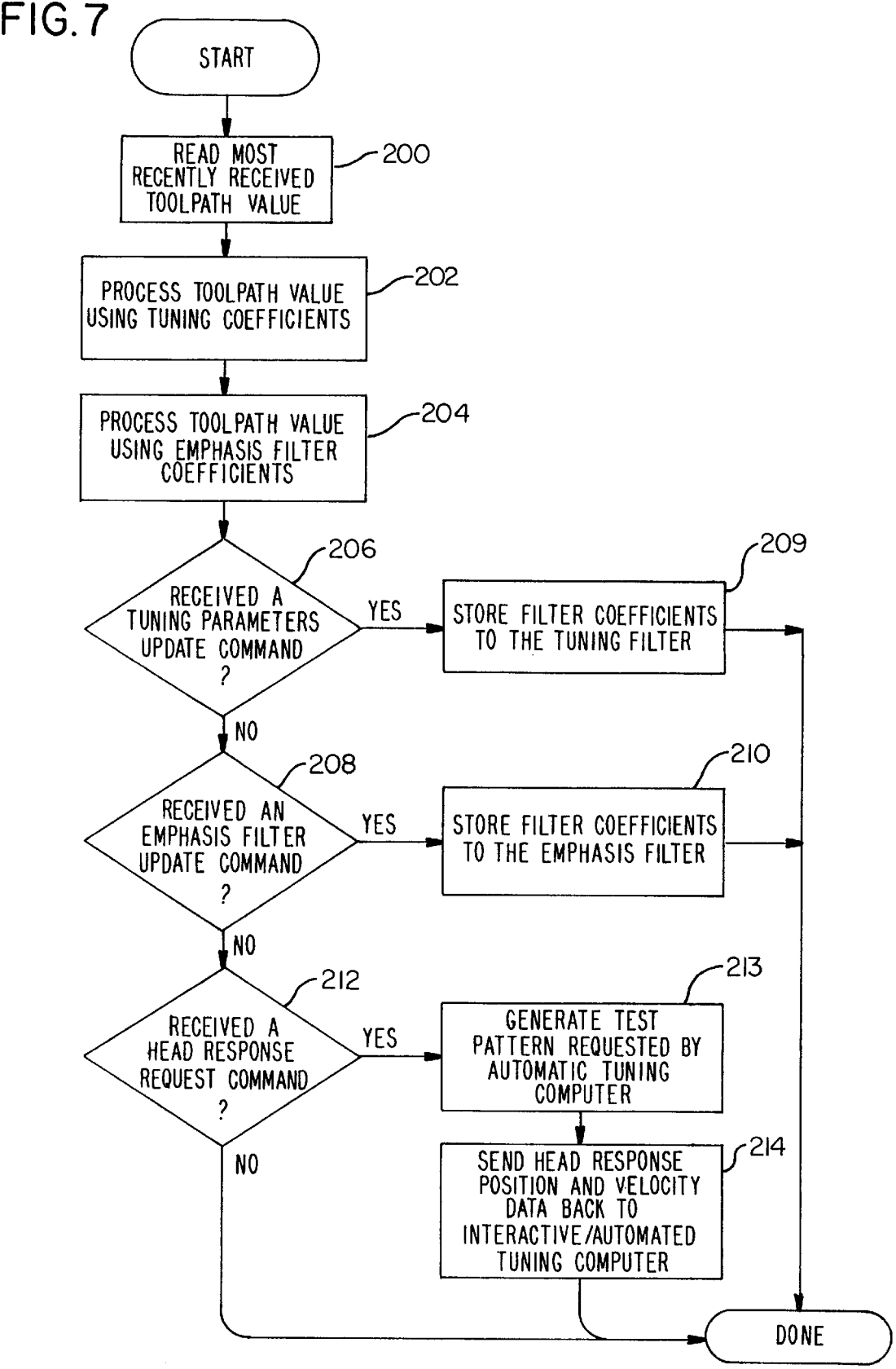

ENGRAVING HEAD MOTOR VELOCITY EXTRACTION BLOCK DIAGRAM

ENGRAVING SYSTEM AND METHOD WITH ARBITRARY TOOLPATH CONTROL

CROSS REFERENCE TO RELATED APPLICATION

This application is a continuation-in-part of patent application Ser. No. 08/434,592 filed May 4, 1995 now U.S. Pat. No. 5,663,803.

BACKGROUND OF THE INVENTION

1. Field of Invention

This invention relates to gravure engraving and, more particularly, to an engraving system and method for providing an improved engraved image by utilizing digital toolpath planning, digital tuning and closed loop feedback control.

2. Description of the Related Art

The process of traditional electromechanical engraving consists of cutting small areas or cells of copper from a surface of a copper cylinder. In the traditional process, the cells are formed by superimposing a screening signal and an image signal. The screening signal is an AC sinusoidal waveform and the image signal is added to it to cause a cutting tool or stylus to move or oscillate to engrave the cells.

In the past, most efforts to improve the quality of an engraved image were focused upon modifications to the image signal. Moreover, edge enhancement, selective linearization, speeding up tuning of the engraving head, and pulse modulation were also used to modify the image signal to improve the engraving quality. One or more of these concepts in prior art engraving systems shown in U.S. Pat. Nos. 5,438,422; 5,424,845; 5,621,533; 5,329,215; 5,416,597; 5,424,846; 5,402,246; 5,454,306; 5,475,914; 5,555,473; 5,440,398; 5,493,939; 4,357,633; 4,438,460; 4,450,486; 4,451,856; 4,500,929; 5,492,057; 5,029,011; 5,519,502; 5,583,647; 5,491,559; 5,422,958; 5,293,426; and 5,617,217 disclose apparatus and methods of the general type used in processes in the past.

Thus, it should be apparent that attempts made to improve engraving quality focused upon, for example, modification of the image signal.

Similarly, U.S. Pat. Nos. 4,245,260 and 5,519,502 illustrate techniques for linearizing and shifting of engraved areas to provide a higher quality engraving. For example, U.S. Pat. No. 5,245,260 discloses techniques for modifying a screening signal in order to control the placement of the cell.

What is needed, therefore, is a system and method which synthesizes the image signal and the screening function as a reference wave form which represents the desired stylus toolpath, thereby reducing or eliminating the need to modify the image and screening signals altogether.

Another problem with the approaches of the past is that the screening and layout of the cells were directly dependent upon the AC sinusoidal waveform, thereby eliminating the flexibility of the engraving quality because prior screening waveforms have consisted of constant AC sinusoids which were difficult to modify sensitive to the image to be engraved. What is also needed, therefore, is a simple, yet effective, method and apparatus for transforming data associated with an image to be engraved into a signal which can be synthesized as an arbitrary toolpath derived directly from the image data.

Moreover, in the past, the mechanical structure of an engraving head exhibited resonance characteristics such that at approximately 2 KHz and 5.5 KHz, the engraving head produced increased output. In order to eliminate these undesired resonances, notch filters were added so that the frequency response of the engraving head was more predictable. Due to the nature of the filter algorithms for the notch filters, a generally smooth, but decreasing, response was achieved. The aforementioned U.S. Pat. Nos. 4,357,633; 4,438,460; 4,450,486; 4,500,929 disclose engraving apparatus and methods of the general type which utilize filtering processes of the past.

Unfortunately, the traditional filtering techniques generally produced an engraving head frequency response which did not carry enough amplitude at higher frequencies, such as frequencies in excess of 5.5 KHz. In addition, the techniques of the past did not permit a user to interactively and easily change the characteristics, such as filter coefficients, of the filters in order to manipulate or tune the engraving head as desired. In the past, the filter characteristics were subject to electronic component errors and could not be moved from one circuit board to another with the required precision.

What is needed, therefore, is a system and method which characterizes the engraving head digitally such that the tuning filter characteristics may be stored separate from the tuning circuitry. The digital filter characteristics may then be archived and in the event of circuit failures loaded into the memory of a replacement circuit with sufficient precision to yield the desired engraving head response characteristic.

In the past, correcting errors or calibrating the engraving head was performed in various manners using various techniques, such as the techniques shown in U.S. Pat. Nos. 5,029,011; 5,293,426; 5,416,597; 5,422,958; 5,438,422; 5,440,398. For example, in some calibrating processes of the past, various characteristics of an individual cell in a test cut were measured and compared to a desired characteristic. If the difference between the desired characteristic and actual characteristic were greater than a predetermined tolerance, then the engraving head was adjusted to account therefor. Typically, the prior art processes utilized optics, strobing, and focusing equipment to achieve such measurements and correction. What is needed is a tool velocity and position sensing system and feedback system and method which is simple in design, relatively inexpensive and easy to implement.

What is needed, therefore, is a method and system for affectively manipulating the placement of an engraved area directly from the image data without either using or manipulating the screening signal.

In the past, the resultant head response characteristic after the lengthy tuning process was subject to the tuning operator's subjective judgement as to tune quality. This led to variations from head to head and difficulty in matching engraving image quality between different engravers and also between heads on multiple headed publications engravers.

What is needed, therefore, is a method and system for automating the tuning process thus removing the variations in engraving head response characteristics. Such a system will improve tuning repeatability in addition to shortening the time required to tune an engraving head.

SUMMARY OF THE INVENTION

It is, therefore, a primary object of the present invention to provide a system and method for synthesizing image data associated with an image to be engraved into a desired cutting tool toolpath, thereby allowing greater flexibility and improvement in engraved quality and the like.

In one aspect, this invention comprises a method for controlling a path of a tool in an engraver comprising the steps of generating image data corresponding to an image to be engraved, generating control points in response to the image data, processing the control points to define a toolpath and driving the tool to engrave a workpiece in response to the toolpath.

In another aspect, this invention comprises a method for engraving a workpiece with a pattern of engraved areas on a workpiece comprising the steps of generating image data corresponding to an image to be engraved, deriving a toolpath directly from the image data, using the toolpath to determine an engraving signal and energizing an engraving head to engrave the workpiece using the engraving signal.

In still another aspect, this invention comprises a toolpath controller for controlling a path of a tool on an engraving head in an engraver comprising an image data processor for generating control points in response to the image data, the image data processor further comprising a toolpath generator for processing the control points to define a toolpath and a signal generator coupled to the image data processor and to the engraving head for receiving the toolpath and for energizing the engraving head to drive the tool to engrave a workpiece in response to the toolpath.

In yet another aspect, this invention comprises an engraver for engraving a workpiece comprising an engraving bed, an engraving head situated on the engraving bed for engraving at least one engraved area on the workpiece, the engraving head comprising a tool, a processor coupled to the engraving head for receiving image data and also for generating an engraving signal for engraving at least one engraved area and a digital toolpath planner associated with the processor for planning a toolpath in response to the image data, the processor using the toolpath to generate the engraving signal.

In another aspect, this invention comprises a method for generating an engraving signal for controlling an engraving head such that a tool on the engraving head follows a desired toolpath, the method comprising the steps of generating an engraving signal and processing the engraving signal to provide an engraving head frequency response defining a substantially constant gain for frequencies less than a predetermined frequency.

In another aspect, this invention comprises an engraving head tuner for tuning an engraving head such that a tool on the engraving head follows a desired toolpath, the engraving head tuner comprising a processor for receiving an engraving signal and also for processing the engraving signal to provide an engraving head frequency response defining a substantially constant gain or frequencies less than a predetermined frequency.

In still another aspect, this invention comprises an engraver for engraving at least one engraved area, the engraver comprising an engraving bed, an engraving head associated with the engraving bed, the engraving head comprising a tool and an engraving head tuner coupled to the engraving head for processing an engraving signal to provide an engraving head frequency response defining a substantially constant gain for frequencies less than a predetermined frequency.

In another aspect, this invention comprises a method for tuning an engraving head, comprising the steps of using at least one filter for filtering an engraving signal to eliminate undesirable resonance, establishing a filter coefficient for at least one filter, coupling a user interface to at least one filter, determining whether at least one parameter for at least one filter needs to be altered, using the user interface to programmably adjust at least one parameter if at least one parameter needs to be altered.

In still another aspect, this invention comprises an engraver comprising an engraving bed, an engraving head associated with the engraving bed, the engraving head comprising a cutting tool and at least one filter associated with the engraving head, at least one filter comprising at least one parameter and at least one filter coefficient and an user interface coupled to at least one filter, the user interface enabling a user to programmably adjust at least one parameter to change a response characteristic of the filter.

In another aspect, this invention comprises a velocity sensor for sensing a position of a cutting tool for engraving a cylinder comprising an armature for holding the cutting tool, at least one electromagnetic driver comprising at least one drive coil therearound for oscillating the armature when at least one drive coil is energized and a sensor positioned in operative relationship with at least one electromagnetic driver for determining a cutting tool position in response thereto.

In another aspect, this invention comprises a method for stabilizing an engraving head comprising a motor for driving a cutting tool comprising the steps of energizing the motor with a first drive signal applied to a first coil, sensing a motor velocity using a second coil and stabilizing the engraving head using the motor velocity.

In yet another aspect, this invention comprises an engraver for engraving at least one engraved area, the engraver comprising an engraving bed, an engraving head associated with the engraving bed, the engraving head comprising an armature having a cutting tool secured thereto, an engraving head tuner coupled to the engraving head for processing an engraving signal to provide a processed signal comprising a frequency response defining a substantially constant gain for frequencies less than a predetermined frequency, at least one electromagnetic driver comprising at least one drive coil, at least one electromagnetic driver being positioned in operative relationship with the armature for oscillating the armature when at least one drive coil is energized with the processed signal and a sensor positioned in operative relationship with at least one electromagnetic driver for determining a velocity of the electromagnetic driver in response thereto, the engraving head tuner tuning the engraving head resonance in response to the velocity and the processed signal.

In still another aspect, this invention comprises a method for scaling image data to be engraved, the method comprising the steps of generating image data corresponding to an image to be engraved, determining whether the image data is continuous tone data or line-work data, generating either continuous tone control points or a line-work control points if it is determined that the image data is continuous tone data or line-work data.

In still another aspect, this invention comprises an engraver for engraving a workpiece comprising an engraving bed, an engraving head situated on the engraving bed for engraving at least one engraved area on the workpiece, the engraving head comprising a tool, a processor coupled to the engraving head for receiving image data and also for generating an engraving signal for engraving at least one engraved area and a digital toolpath planner associated with the processor for planning a toolpath in response to said image data, the processor using the toolpath to generate the engraving signal.

Other objects and advantages of the invention will be apparent from the following description, the accompanying drawings, and the appended claims.

BRIEF DESCRIPTION OF THE ACCOMPANYING DRAWINGS

FIG. 4A is an illustration of image data, control points generated using the image data, and a toolpath generated from the control points;

Figure 3:
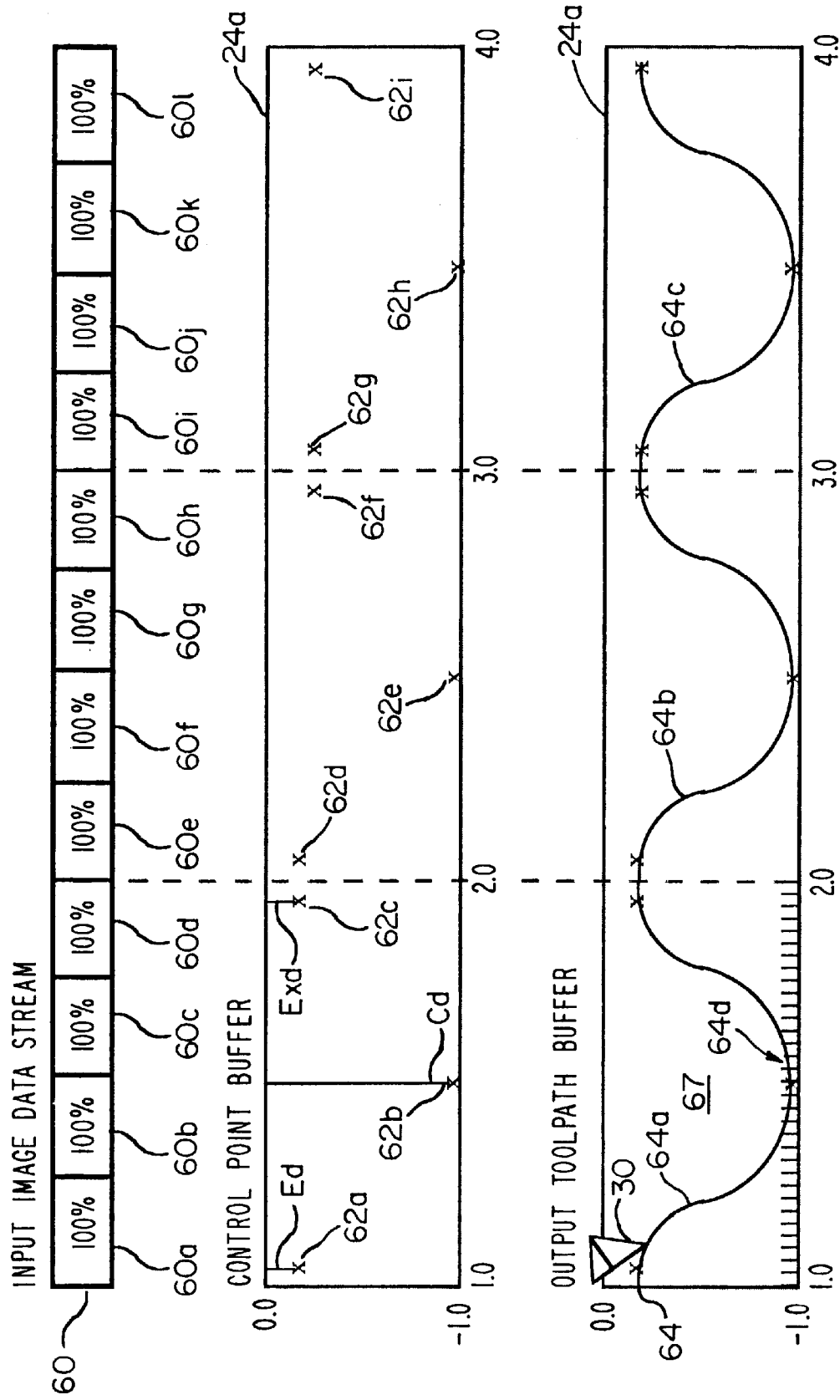
FIG. 3 is an illustration of image data, control points generated using the image data, and a toolpath generated using the control points.
Figure 5A:
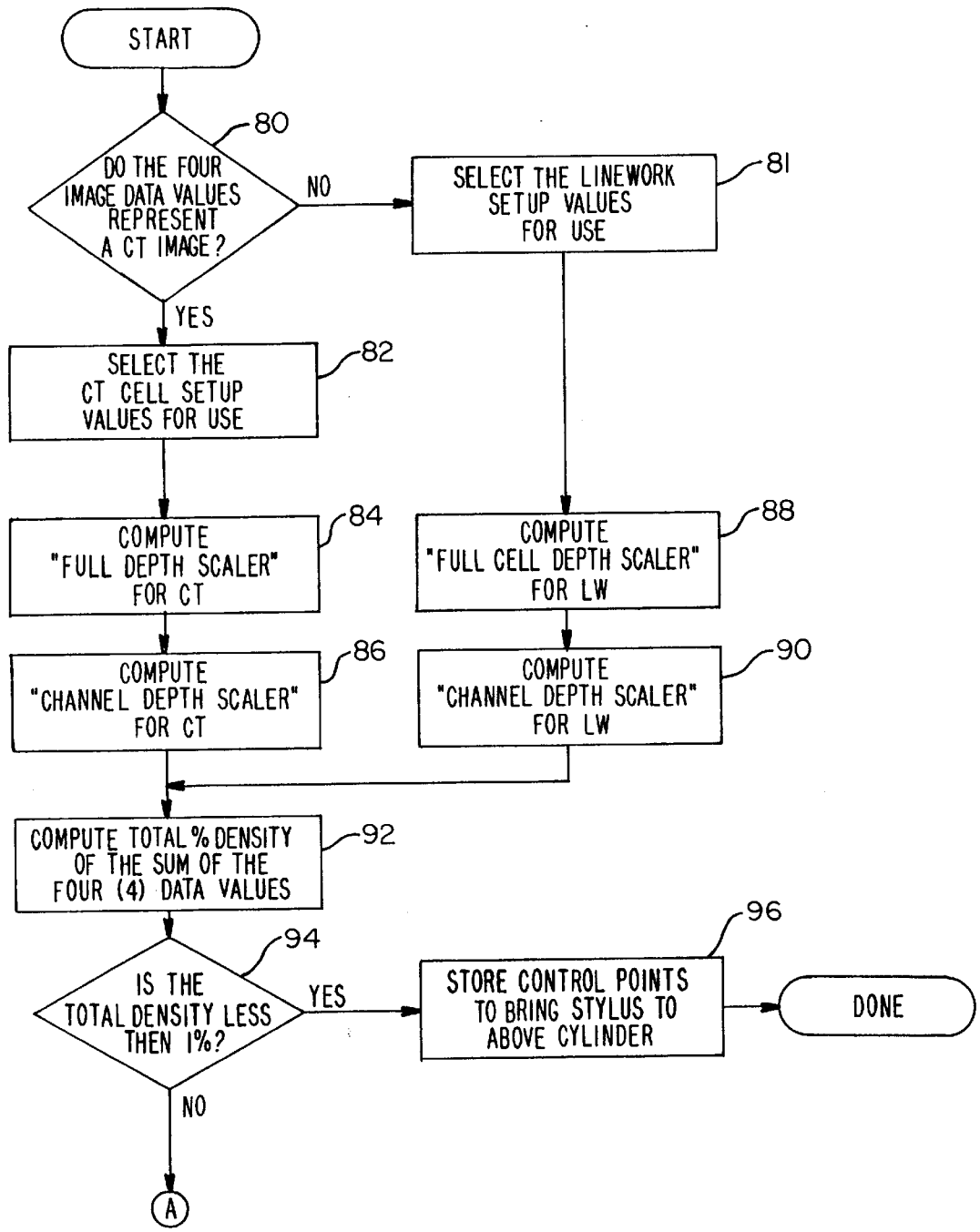
Figure 8:
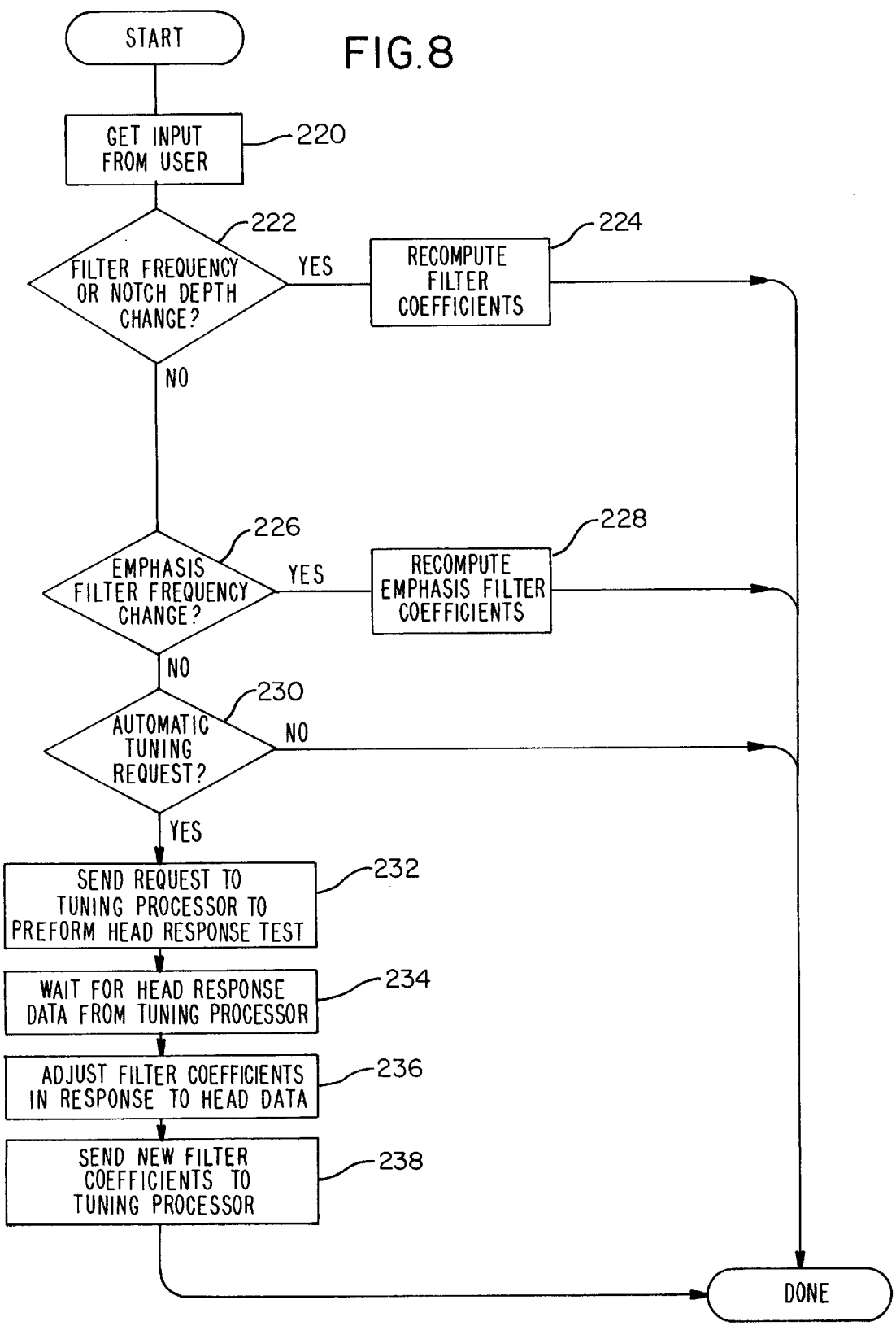
Figure 9:
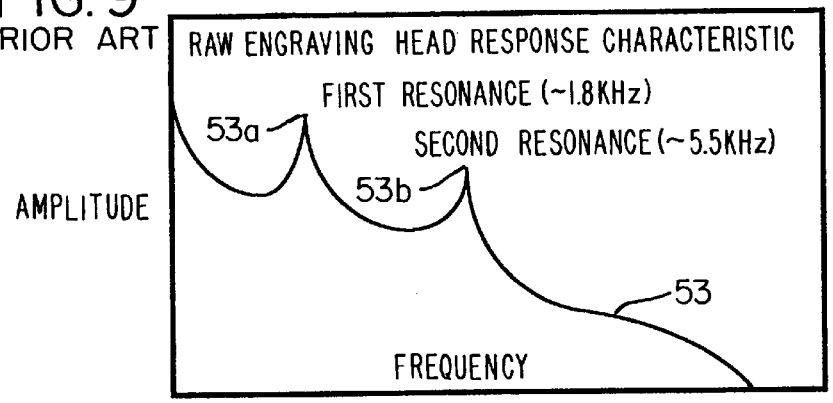
Figure 10:
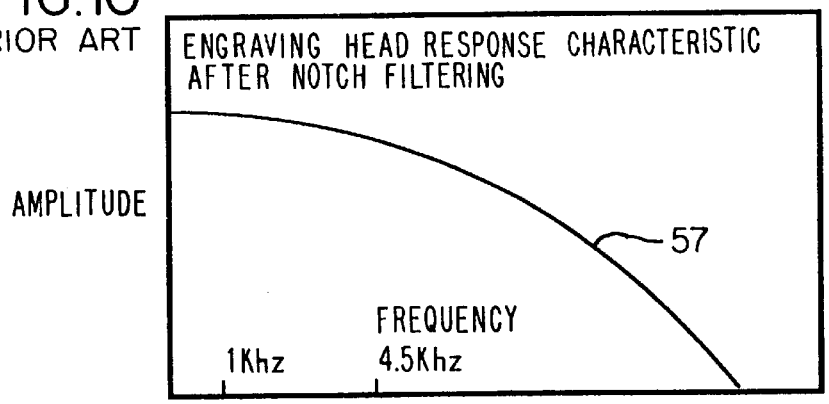
Figure 11:
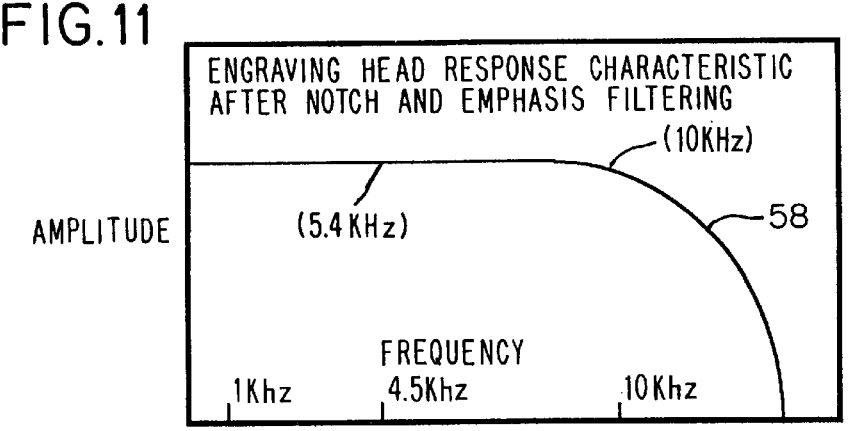
Figure 12:
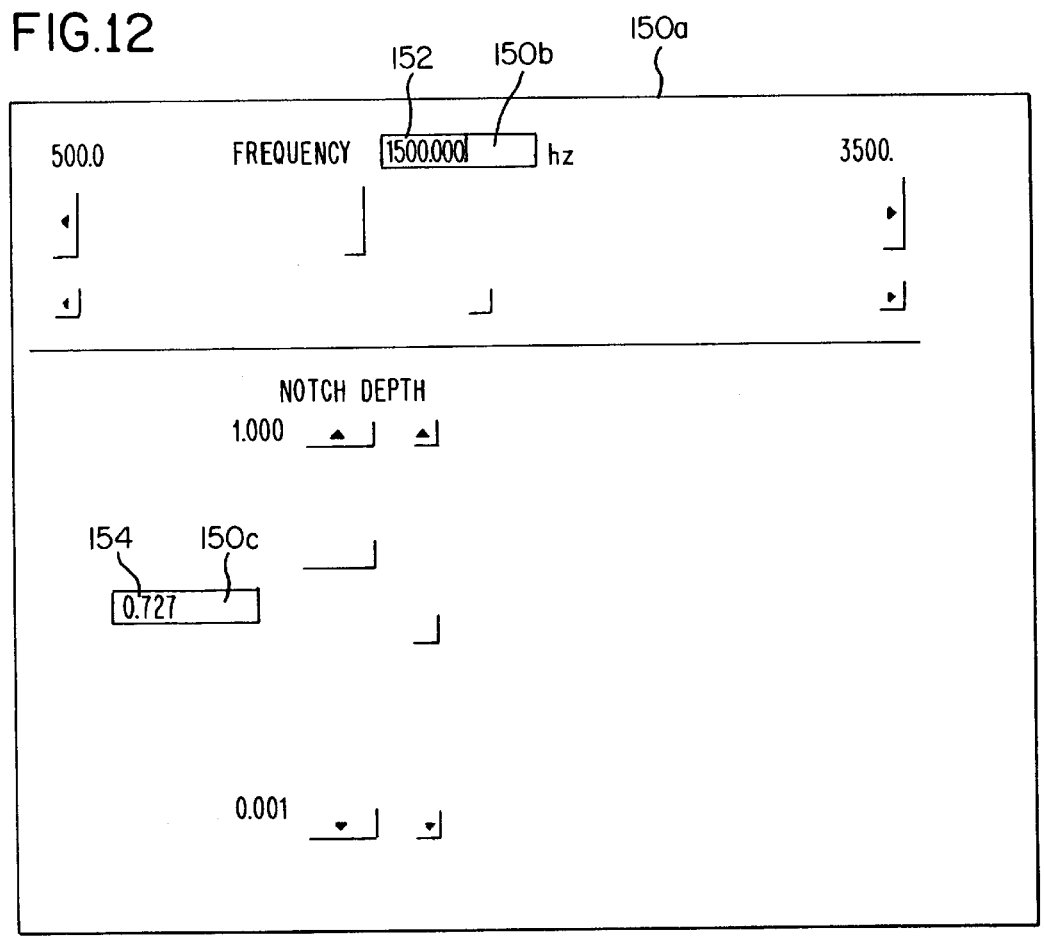
Figure 13:
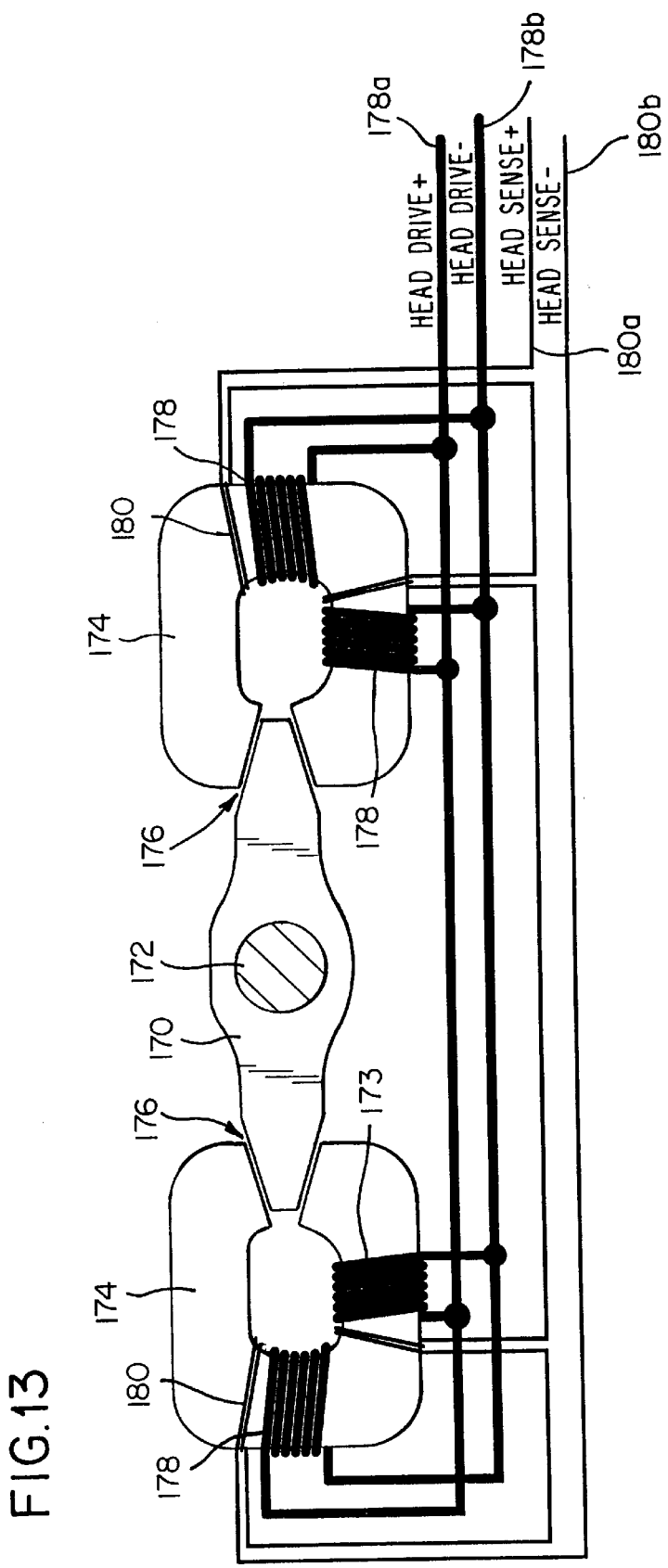
Figure 14:
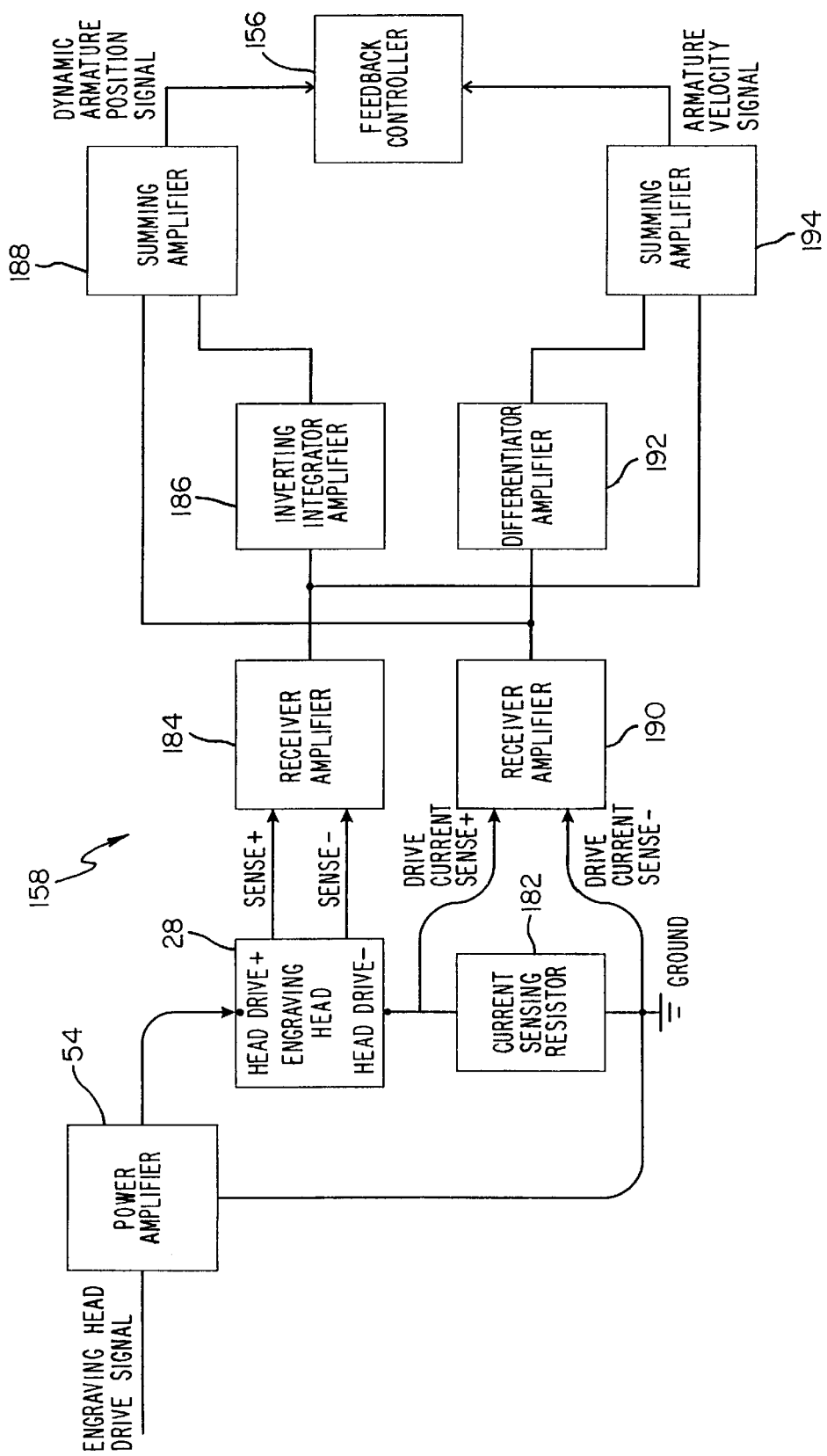
Figure 15:
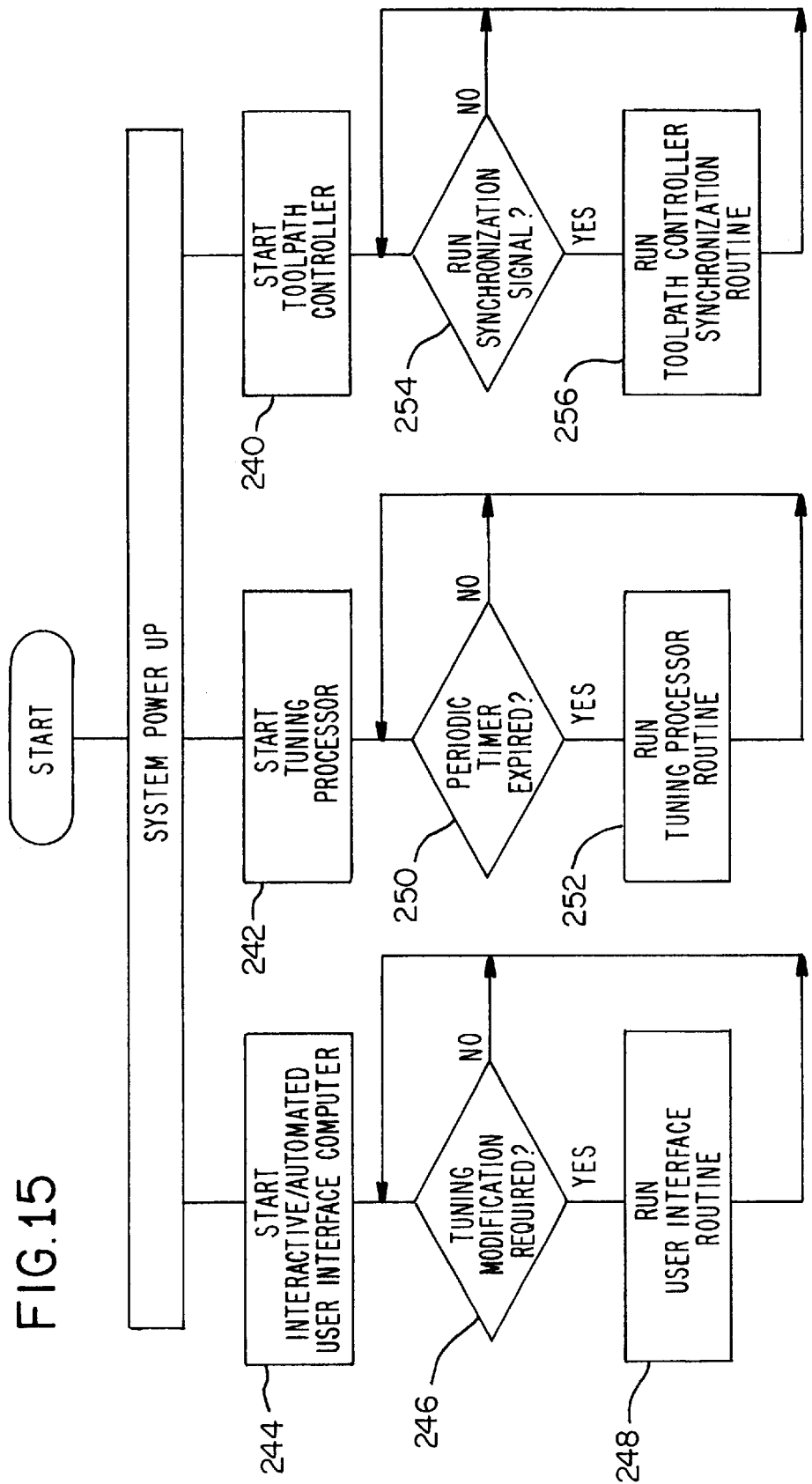
Figure 16:
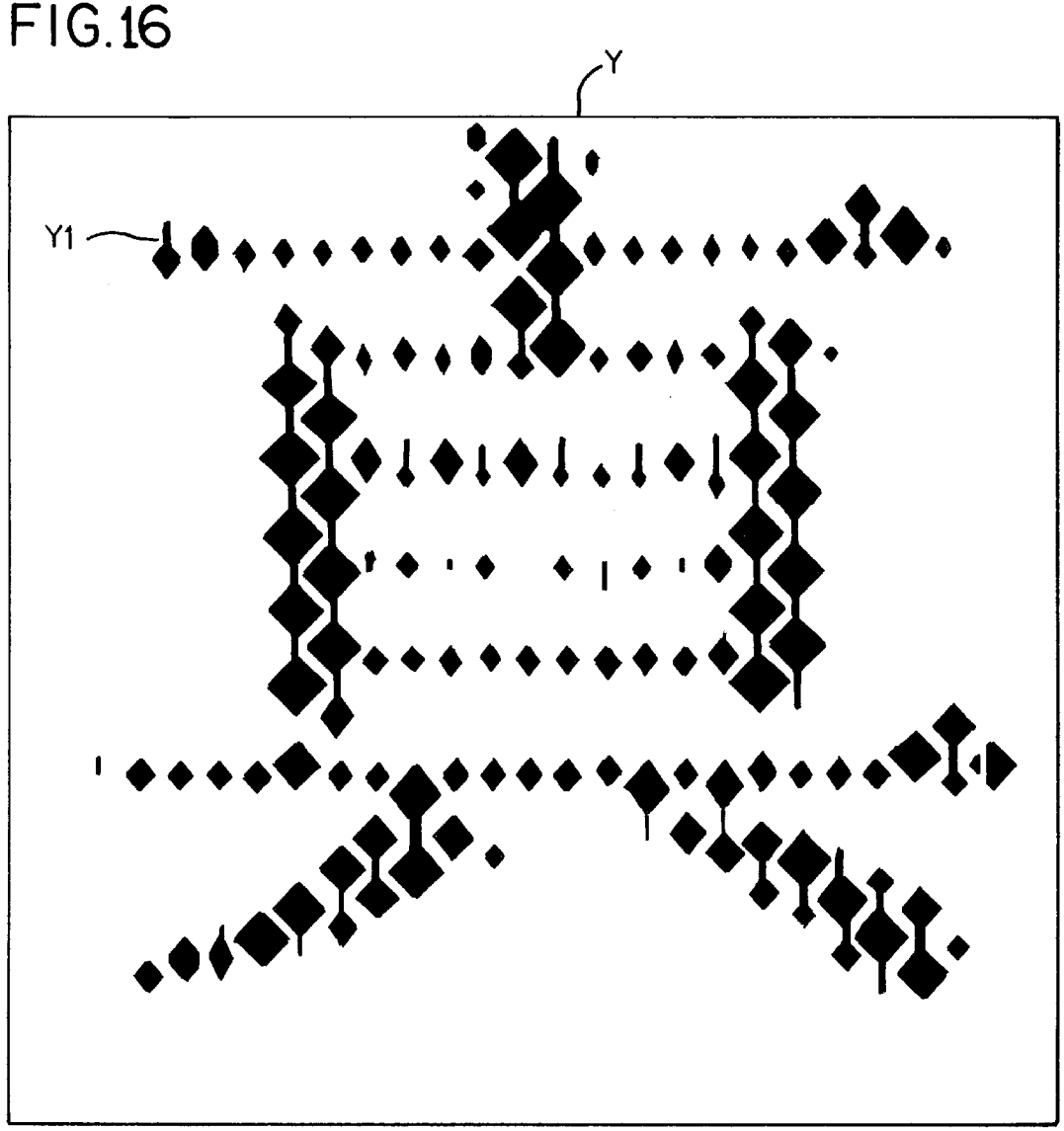
Figure 17:
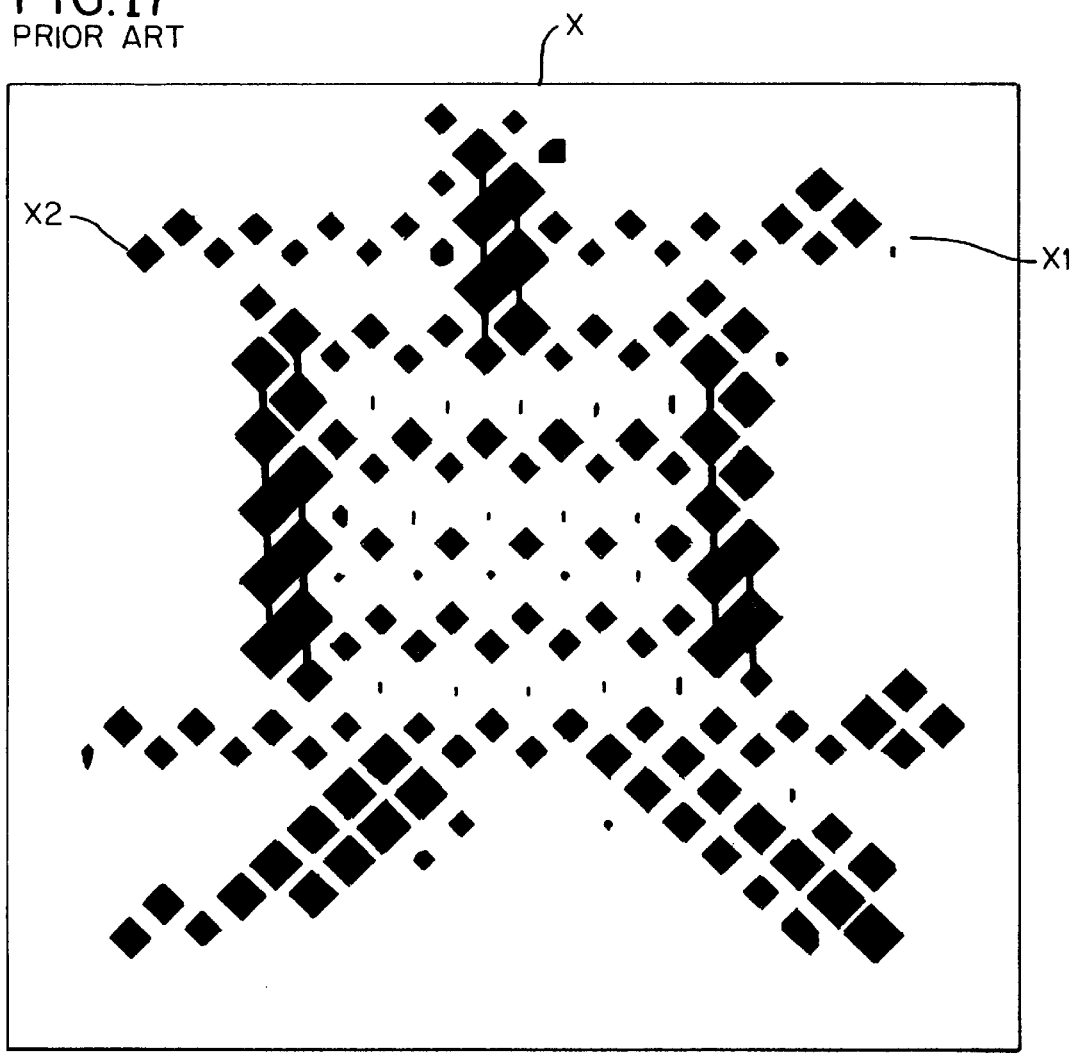

FIGS. 5A and 5B, taken together, illustrate a system and method or routine for generating control points, such as the control points shown in FIG. 3;

FIG. 6 is another schematic illustration of a synchronization routine in accordance with one embodiment of the invention;

FIG. 7 is a schematic view of a tuning process system and routine;

FIG. 8 is a schematic view of an automatic tuning user interface routine in accordance with one embodiment of the invention;

FIG. 9 is a graphical view of a typical prior art engraving head response;

FIG. 10 is a graphical view of a prior art engraving head response after notch filtering;

FIG. 11 is a graphical view of engraving head response characteristic after filtering in accordance with the present invention;

FIG. 12 is a view of a user interface in accordance with one embodiment of the present invention;

FIG. 13 is a sectional view of an engraving head motor, showing an armature, a velocity sensing coil associated with a pair of electromagnets;

FIG. 14 is a schematic illustration of a cutting tool velocity and position extraction circuit in accordance with one embodiment of the present invention;

FIG. 15 is overall schematic diagram of an operation of the system and routine of the present invention upon system power up;

FIG. 16 illustrates a kanjii character engraved using features of the present invention; and FIG. 17 illustrates a kanjii character engraved using prior art techniques.

DETAILED DESCRIPTION OF THE PREFERRED EMBODIMENTS

Figure 1:
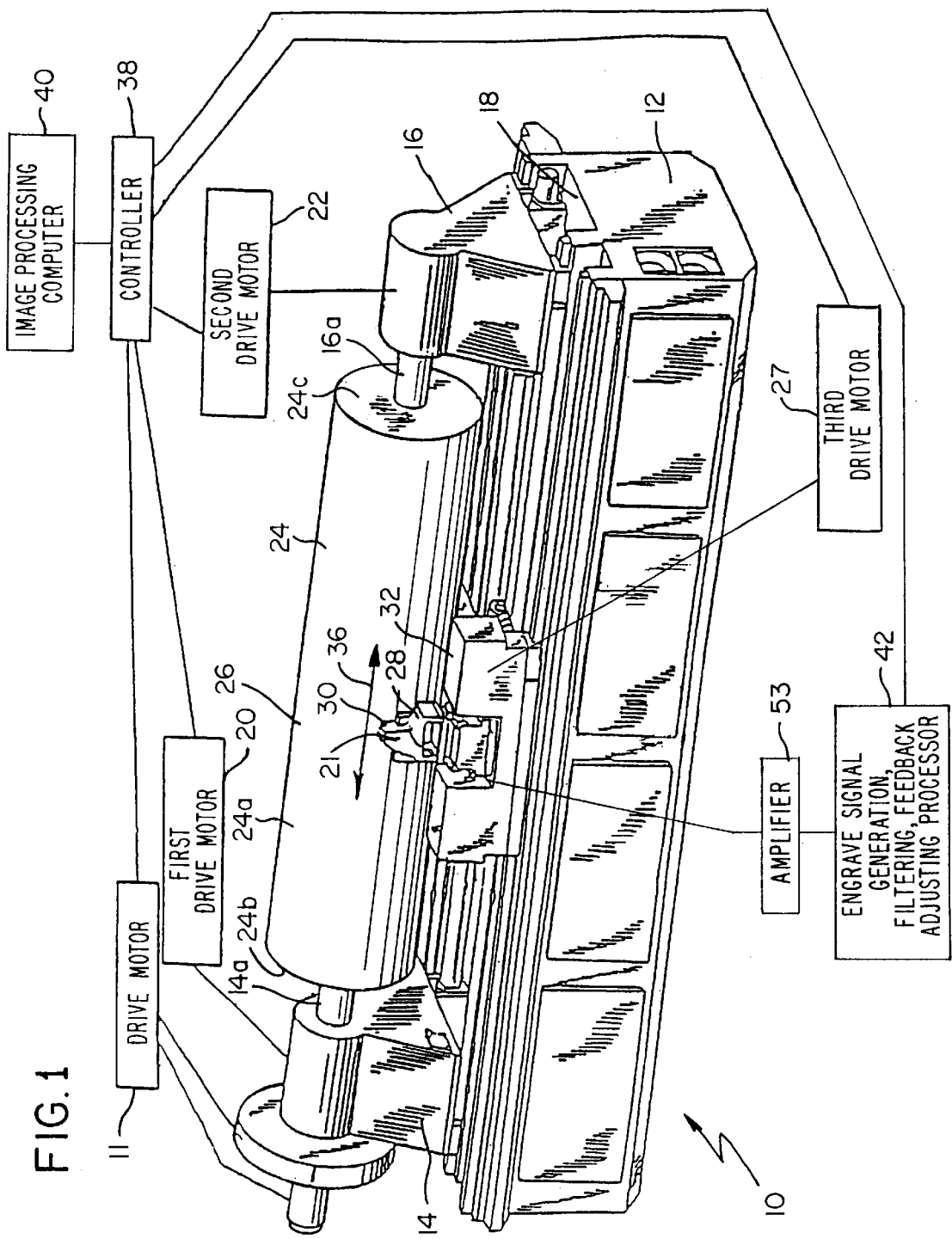
FIG. 1 is a perspective view of an engraving system comprising features of the present invention.

FIG. 1 is a perspective view of a preferred embodiment of an engraver, designated generally as engraver 10. In the embodiment being described, the engraver 10 is a gravure engraver, but the invention may be suitable for use with other types of engravers. The engraver 10 may have a surrounding slidable safety cabinet structure which is not shown for ease of illustration. Engraver 10 comprises a base 12 having a headstock 14 and tailstock 16 which are slidably mounted in a track 18 such that the headstock 14 and tailstock 16 can move towards and away from each other. In this regard, engraver 10 comprises a plurality of linear actuators or first drive motor means or a first drive motor 20 and a second drive motor means or second drive motor 22 which are capable of driving the headstock 14 and tailstock 16, respectively, towards and away from each other. For example, the drive motors may cause the headstock 14 and tailstock 16 to be actuated to a fully retracted position or to a cylinder support position shown in FIG. 1.

The drive motors 20 and 22 may be selectively energized to cause headstock 14 and tailstock 16 to be actuated either independently or simultaneously. Although not shown, a single drive motor may be used with a single lead screw (not shown) having reversed threads (not shown) on which either end causes the headstock 14 and tailstock 16 to move simultaneously towards and away from each other as the lead screw is driven. Driving both the headstock 14 and tailstock 16 permits cylinders 24 of varying lengths to be loaded by an overhead crane, for example, whose path is perpendicular to the cylinder's 24 axis of rotation. However, it should be appreciated that a stationary headstock 14 and tailstock 16 may be used with a driven tailstock 16 or headstock 14, respectively, if, for example, a cylinder loading mechanism (not shown) loads the cylinder 24 by moving it in a direction which is generally parallel to the axis of rotation of the engraver 10.

As best illustrated in FIG. 1, the cylinder 24 comprises a first end 24b and a second end 24c each having receiving openings (not shown) for receiving ends 16a and 14a, respectively. In general, the ends 14a and 16a are conically shaped and compliment the shape of the receiving openings in order to support the cylinder 24 at an engraving station 26 of the engraver 10. Although not shown, if a shafted cylinder is to be engraved, then the headstock 14 and tailstock 16 would each include a gripping device or chuck (not shown) to rotatably support the cylinder 20 at the engraving station 26.

The engraver 10 also comprises an engraving head 28 having a cutting tool or stylus 30 for engraving a surface 24a on the cylinder 24. In the embodiment being described, surface 24a preferably has a copper coating of the type used in gravure engraving. The engraving head 28 is slidably mounted on a carriage 32 such that a third drive means or third drive motor 27 can drive the engraving head 28 towards and away from the cylinder 24 in a direction which is generally radial with respect to the center axis of cylinder 24. The carriage 32 is also slidably mounted on base 12 such that it traverses the entire surface 24a of cylinder 24 in the direction of double arrow 36 in FIG. 1. Note that this direction is generally parallel to the axis of the cylinder 24. The engraver 10 also comprises a lead screw (not shown) and drive motors (not shown) for causing the carriage 32 to move in the direction of double arrow 36. Various features of the following patents may be used in the engraving system and method of the present invention is similar to that shown in U.S. Pat. Nos. 5,424,845, 5,424,846, 5,438,422, 5,440,398, 5,454,306, 5,492,057 and 5,329,215 all of which are assigned to the same assignee as the present invention and which are incorporated herein by reference and made a part hereof.

The engraver 10 also comprises a drive means or a drive motor 11 while rotatably driving the support shaft 14a in order to rotatably drive the cylinder 24 when energized by an engraver controller 38. In this regard, the engraver 10 comprises the engraver controller 38 which generally controls the operation of the engraver 10 and which also controls all the drive motors, such as drive motors 11, 20, 22 and 27. The drive motors 11, 20, 22 and 27 are selectively responsive to the engraver controller 38.

The engraver 10 further comprises an image processing means or image processing computer 40 coupled to controller 38 for generating digital image data associated with an image to be processed and/or engraved by engraver 10. One suitable image processing computer 40 is the image processing work station model no. IPW-2000 available from Ohio Electronic Engravers, Inc. of Dayton, Ohio who is the assignee of the present invention.

A feature of the present invention is that it provides means for generating a toolpath to be followed by stylus 30 in order to engrave a series of engraved areas in response to a stream of digital image data. In this regard, the engraver 10 comprises at least one digital signal processor or processing means (shown schematically as block 42 in FIG. 1) coupled to controller 38 for processing any image data or signal received from controller 38, filtering, and adjusting the signal received in response to various feedback information in the manner described later herein. The processing means 42 is also coupled to an amplifier 53 for amplifying any signal generated by processing means for transmission to engraving head 28 in order to energize engraving head 28 to move stylus 30 to engrave a pattern of engraved areas on cylinder surface 24a.

Figure 2:
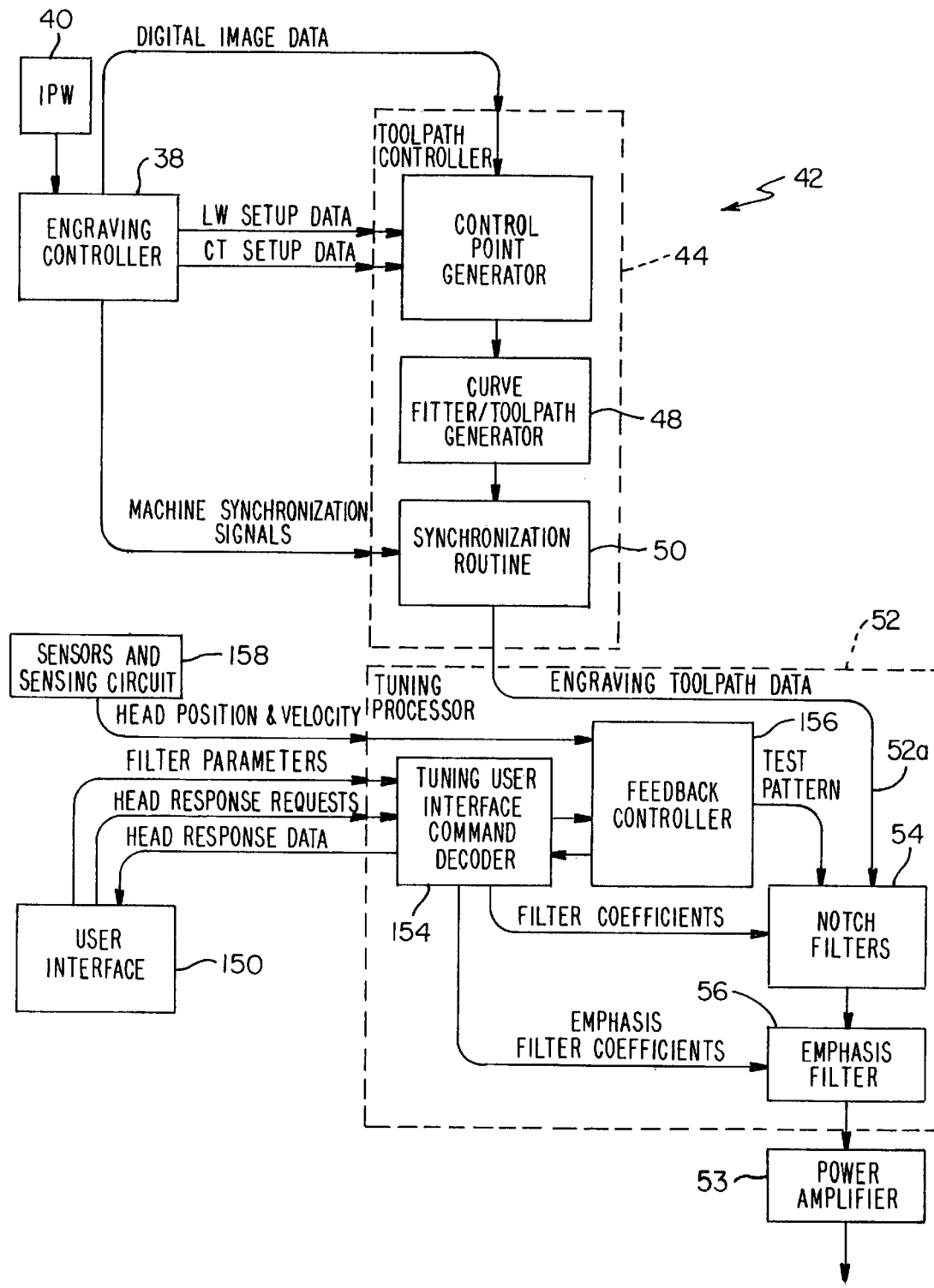
FIG. 2 is a schematic diagram illustrating a processor in accordance with an embodiment of the invention.

As best illustrated in FIG. 2, the digital signal processor 42 comprises toolpath means or a toolpath controller 44 for generating an engraving toolpath to be followed by stylus 30 in order to effect engraving.

In general, processor 42 is capable of generating a plurality of digital control points, such as points 62a–62i in FIG. 3 in response to a digital image data stream 60 received from engraver controller 38. The engraver controller 38 receives the digital image data stream 60 from the image processing computer 40 (FIG. 1) mentioned earlier herein. The method and apparatus for generating the control points from digital image data and generating an engraving toolpath in response to those control points will now be described relative to FIGS. 2–6.

As illustrated in FIG. 2, the processor 42 comprises the toolpath controller 44 comprising generating means or a generator 46 for receiving the digital image data from controller 38 and for generating a plurality of control points, such as the aforementioned control points 62a–62i shown in FIG. 3. The generator 46 receives the image data in the form of the stream 60 (FIG. 3) of digital density values, such as the density values identified as 60a, 60b ... 60l in FIG. 3. For ease of illustration, the density values are represented as a percentage, with 0% density representing a white or non-engraved area and 100% density representing a full black engraved area.

In the embodiment being described, the stream 60 of digital density values comprises four (4) data values for each area to be engraved. The control point generator 46 receives the data values and generates the plurality of control points 62a–62i (FIG. 3) in response thereto. Thus, for example, the image data values 60a–60d from image data stream 60 are received by the generator 46 and a plurality of corresponding control points 62a–62c are generated in response thereto.

The toolpath controller 42 also comprises a curve fitter/toolpath generator 48 which receives the plurality of control points 62a–62i and generates a toolpath, such as toolpath 64 in FIG. 3, in response thereto. By way of illustration relative to FIG. 3, the portion 64a of the toolpath 64 is generated using the generated control points 62a–62c. Likewise, the portion 64b and 64c of toolpath 64 are generated using the control points 62d–62f and 62g–62i, respectively.

In the embodiment being described, the curve fitter/toolpath generator 48 comprises a cubic spline interpolator or curve fitting routine or means resident in suitable memory (not shown) of the processor 42 for receiving the control points, such as points 62a–62i, and for generating the toolpath 64 in response thereto. In the embodiment being described, the generator 48 breaks the toolpath 64 into 32 discrete data segments, one of which is illustrated as 64d in FIG. 3. These 32 discrete data segments are ultimately transmitted to the tuning processor 52 as described later herein. In this regard, curve fitting techniques shown and described in the *Numeric Recipes in C the Art of Scientific Computing,* second edition, Cambridge University Press, Section 3.3—Cubic Spline Interprelation, may be used to apply a curve to the control points being processed.

The digital signal processor 42 and toolpath controller 44 further comprises synchronizing means or synchronization routine 50 for receiving machine synchronization signals from engraving controller 38 and for synchronizing the digital toolpath 64 to the rotation of the cylinder 24. The operation of the control point generator 46, toolpath generator 48 and synchronization routine 50 will now be described relative to FIGS. 5A, 5B and 6.

The operation begins at decision block 80 (FIG. 5A) where control point generator 46 segments data values 60a–60l into groups of four and determines whether each of the four (4) image data values, such as values 60a–60d in FIG. 3, represent a continuous tone ("CT") image. In this regard, it should be appreciated that the image data values 60a–60d comprise an image intensity value and an indicator which distinguishes the source of the data as either "CT" or "LW". If the decision at decision block 80 is negative, then the image data value received by control point generator 46 from controller 38 represents a linework ("LW") image.

The control point generator 46 selects (block 81) appropriate setup values (not shown) for use in processing the LW image data value. The setup values used in this processing comprise the AC gain, DC gain, and offset values as taught in OEE patents 5,424,848 and 5,621,533 which are incorporated herein by reference and made apart hereof. If the decision at decision block 80 is yes, then the image data value represents a CT image and the routine proceeds to block 82 where it selects CT setup values for use by control point generator 46.

The routine proceeds to block 84 where control point generator 46 determines a plurality of scalers which are used to scale the image data values 60a–60d (FIG. 3) The control point generator 46 first determines or computes a full cell depth scaler (block 84) using the CT setup values, and a channel depth scaler (block 86) for CT is also computed using the CT setup values.

At blocks 88 and 90 (FIG. 5A), a full cell depth scaler for LW and a channel depth scaler for LW, respectively, are computed.

After blocks 86 and 90, the routine proceeds to block 92 where control point generator 46 computes a total percentage density of the sum of four (4) image data values. At decision block 94, it is determined whether the total density is less than one percent (1%), thereby indicating a non-engraved area. If it is, then the routine proceeds to block 96 where control point generator 46 assigns and stores control points which will cause stylus 30 to be situated above surface 24a of cylinder 24 during actual engraving. Thereafter, the routine is complete.

If the decision at decision block 94 is negative, then the routine proceeds to decision block 98 (FIG. 5B) where it is determined whether a multiple frequency cell or engraved area is required. In the embodiment being described, the multiple frequency decision (block 98) is yes if both the conditions exist where the first data value is greater than the sum of the second and third data value (for example, 60a>(60b+60c)) and the fourth data value is greater than the sum of the second data value and the third data value (for example, 60d. (60b+60c)).

Figure 4:
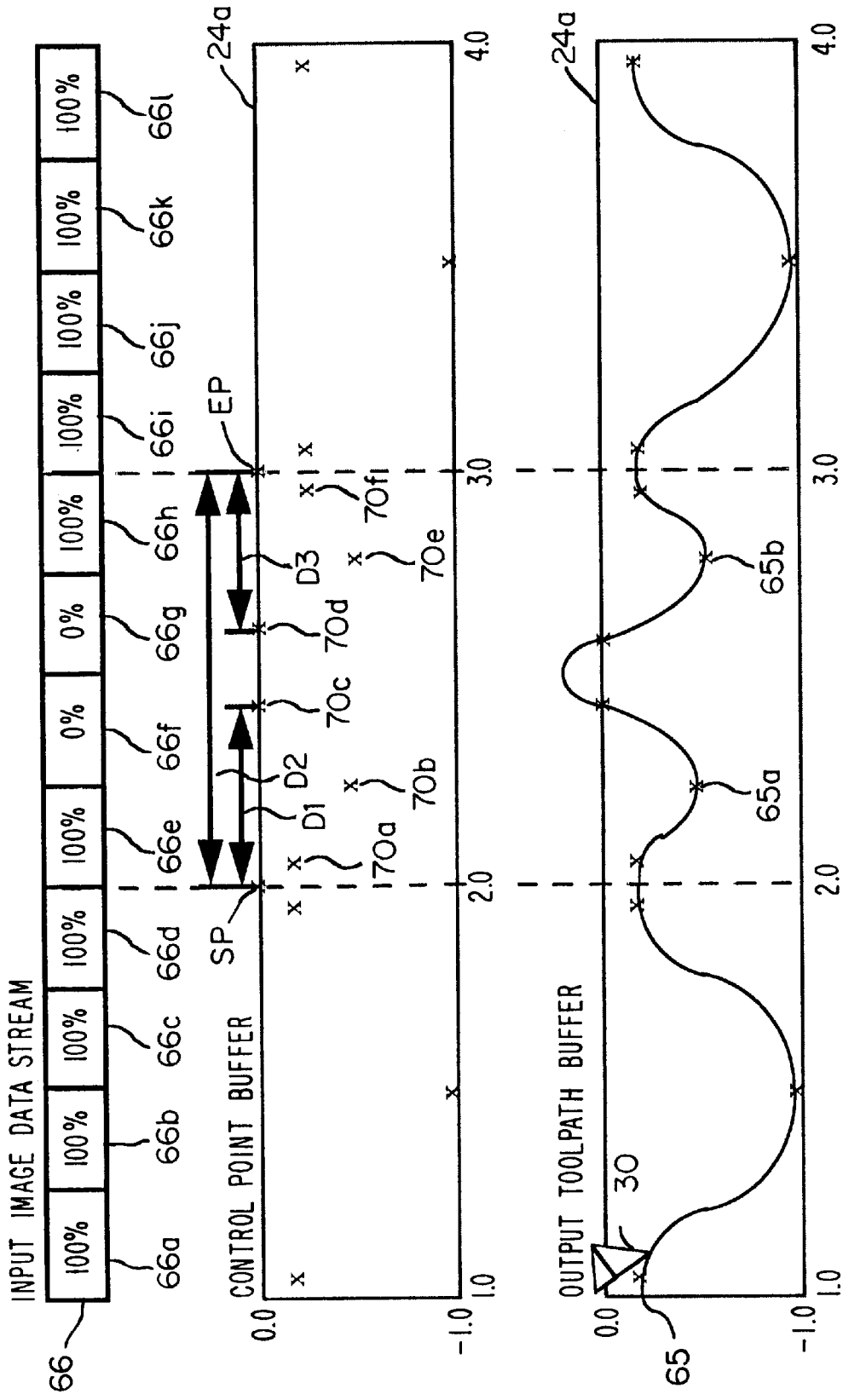
FIG. 4 is an illustration of image data, control points generated using the image data, and a toolpath generated from the control points.

FIG. 4 illustrates another stream 66 of image data values comprising a plurality of density values 66a–66l. Notice in the illustration being shown in FIG. 4 that density values 66e–66h show density values from black (100%) to white (0%) to white (0%) to black (100%), thereby indicating multiple frequency engraved areas because 66e>(66f+66g) and 66h>(66f+66g). The engraved areas represented by these density values are illustrated by the engraved areas 65a and 65b defined by a toolpath 65 which was generated using the density values 66a–66l. The generation and procedure for generating toolpath 65 (FIG. 4) representing multiple engraved areas is described later herein.

If the answer at decision block 98 (FIG. 5B) is negative, then a multiple frequency engraved area is not required, and the routine proceeds to block 100 where an entry control point or location and depth is determined. In this regard, an entry point, such as point 62a in FIG. 3, is determined and an entry depth (identified as Ed in FIG. 3) is determined by applying the appropriate CT or LW channel scaler to the first image data value, which in this example is 60a. It should be appreciated that the depth Ed is the depth at which stylus 30 will penetrate surface 24a. Likewise, at block 102, a center point location 62b and center point depth (identified as Cd in FIG. 3) is determined. The center depth Cd is determined by applying the full depth scaler to the previously computed total % density (block 102 in FIG. 5B). The center point location is determined by computing the center of image density of data values 60a–60d and locating control point 62b such that an equal amount of density is left and right of 62b. Thus, the center of the engraved cell is shifted towards the denser image data values to improve reproduced image quality. This feature is illustrated relative to engraved area 75 in FIG. 4A and its associated control point 71a–71c. The routine continues to block 104 where an exit point location (identified as point 62c in FIG. 3) and an associated exit depth Exd is determined at block 104. Thereafter, the routine is complete.

If a multiple frequency engraved area is required, then the decision at decision block 98 will be affirmative. The routine will proceed to block 106 as shown where control point generator 46 proceeds to generate control points, such as points 70a, 70b and 70c for the first subset of image data values 66e and 66f and control points 70d, 70e and 70f for the second image data subset represented by density values 66g and 66h.

As illustrated in FIG. 4, the routine separates the image data value stream 66 into subsets of four data values representing multiple engraved areas. In the illustration being described and shown in FIG. 4, the associated toolpath 65 will ultimately be generated to drive stylus 30 to engrave dual or double frequency engraved areas, such as areas 65a and 65b illustrated in FIG. 4. The procedure of operation for processing multiple frequency data values will now be described.

At block 106 in FIG. 5B, control point generator 46 computes a total density for the first pair of data values, such as data values 66e and 66f in FIG. 4. The routine proceeds to block 108 where control point generator 46 determines a center of image density for this first pair of data values. At block 110, control point generator 46 then determines a first entry control point location, such as control point 70a shown in FIG. 4, and associated entry depth. The first entry point depth is determined using the first data value 66e and applying the channel depth scaler thereto. At block 112, control point generator 46 determines a first center point location (point 70b in FIG. 4) and depth. The first center point 70b is placed at the center of image density and its associated depth is set by applying the full depth scaler to the % total density for the first pair of data values 66e and 66f. At block 114, a first exit location (point 70c) and associated depth is determined.

The stylus 30 exits the surface 24a at exit point 70c. This point 70c is a distance $D_1$ (FIG. 4) away from a starting point SP. This distance $D_1$ varies relative to the total distance $D_2$ in the same proportion as the total percent density computed at block 106 in FIG. 5B.

The control point generator 46 then proceeds to determine the control points 70d–70f associated with the second image data value subset (values 66g and 66h in the illustration shown in FIG. 4). Accordingly, at block 116 (FIG. 5B), control point generator 46 determines a total density for the second pair of data values 66g and 66h. At block 118, the control point generator 46 locates a center of the image density for the second image data subset. At block 120, a second entry location and depth control point (point 70d in FIG. 4) is then determined. The stylus 30 enters the surface 24a at entry point 70d. This point 70d is a distance $D_3$ (FIG. 4) away from an ending point EP. This distance $D_3$ varies relative to the total distance $D_2$ in the same proportion as the total percent density computed at block 116 in FIG. 5B.

The routine proceeds to block 122 (FIG. 5B) where a second center location (point 70e) and depth control point are determined. The second center point 70e (FIG. 4) is placed at a center of image density of the second pair of data values 66g and 66h. The second center point depth is set by applying the full depth scaler (determined at block 84 for CT data or 88 for LW data in FIG. 5A) to the percent total density (block 116 in FIG. 5B) for the second pair of data values 66g and 66h. At block 124, a second exit location (point 70f) and depth control is determined. The second exit point 70f depth is determined using the last data value 66h and applying the channel depth scaler (block 86 or 90 in FIG. 5A).

Once all control points 70a–70f are generated by control point generator 46, they are transmitted to the curve fitter/toolpath generator 48 which processes the generated control points 70a–70f which are stored in memory, such as a control point buffer (not shown). Control point generator 46 interpolates or "fits" a corresponding curve to the control points 70a–70f in order to generate the toolpath (such as toolpath 65 in FIG. 4). This toolpath 65 is stored in memory, such as output buffer (not shown) and will subsequently be used to generate an engraving drive signal for energizing engraving head 28.

The digital signal processor 42 also comprises the synchronization means or synchronization routine 50 mentioned earlier herein for receiving machine synchronization signals from engraving controller 38 and for synchronizing the generated toolpath, such as toolpaths 64 or 65, with the engraver 10. The synchronization routine will now be described relative to FIG. 6. The routine begins at block 126 by reading a section, such as section 64d (FIG. 3) of the toolpath 64.

The routine transmits the generated toolpath to the tuning processor 52 (FIG. 2) for use in the manner described later herein (block 128 in FIG. 6).

The routine also collects incoming image data stream 60 and initiates generation of, for example, toolpath 64 in response thereto. It should also be appreciated that the routine receives from controller 38 image data 60 at a rate of 4 data values (e.g., values 60a–60d in FIG. 3) for each single frequency engraved area, such as area 67 (FIG. 3). Substantially simultaneously therewith, the routine transmits toolpath 64 data to the tuning processor 52 at a rate of 32 data values or segments (such as segment 64d in FIG. 3) per single frequency engraved area (such as area 67 in FIG. 3).

The routine then proceeds to block 130 (FIG. 6) where image data stream 60 (FIG. 3) is received from controller 38 at 4 data values (e.g., 60a–60d) per single frequency engraved area.

Thereafter, the image data, such as data 60a–60d, are stored in suitable memory by toolpath controller 44.

At decision block 134, it is determined if the four (4) image data values, such as values 60a–60d in FIG. 3, have been received by toolpath controller 44. If they have not, then the routine exits. If the image data values have been received, then the routine proceeds to block 136 (FIG. 6) where the data values 60a–60d are processed into the control points 62a–62c using the aforementioned control point generator 46 in the manner described earlier herein relative to FIGS. 5A and 5B.

At block 138, the control points are further processed into the toolpath, such as toolpath 64 in FIG. 3, by toolpath generator 48 as described earlier herein. Thereafter, the synchronization routine or means is complete and the toolpath is synchronized with the operation of the engraver 10.

Advantageously, this invention synthesizes the digital image data stream 60 and the traditional screening function into a reference toolpath or waveform which represents the desired toolpath to be followed by stylus 30. It should be appreciated that the screening traditionally used is synthesized directly from the digital image data, thereby allowing much greater flexibility and improvement in engraving quality.

In the embodiment being described, the image data is transformed into the above-mentioned control points at which the stylus 30 is to enter (point 62a in FIG. 3), reach maximum depth (point 62b in FIG. 3), and exit (point 62c in FIG. 3) for each area (like area 67 in FIG. 3) to be engraved. As mentioned earlier herein, the control points are thereafter used by the curve fitter/toolpath generator 48 to generate, interpolate or "fit" the toolpath, such as toolpath 64, to define the engraving path with the stylus 30 will follow. The result is that the toolpath 64 will be generated and used as the stylus 30 toolpath derived directly from the digital image data.

A further feature of the invention is that the apparatus and method of the present invention facilitates digitally distorting the generated toolpath, for example, in order to shift one or more centers of engraved areas or partial engraved areas, particularly at the edges of an image (not shown). Thus, notice in FIG. 4A, the image values 69a–69d represent 100% (full black), 100% (full black), 0% and 0% densities. Most engraving systems of the past may average these densities to produce a cell (not shown) having 50% density which is generally in the center of region 74.

In contrast, the present invention and control point generator 46 evaluates the image data and generates corresponding control points 71a–71c as shown. These control points 71a–71c are then used by toolpath generator 48 to generate the toolpath curve 73.

Notice that the toolpath defines a shifted engraved area 75 which more accurately corresponds to the image data 69a and 69b originally input.

This feature facilitates boosting the quality of the engraved images. For example, notice in FIG. 17, a kanjii character pattern X is engraved using conventional engraving techniques. In contrast, pattern Y (FIG. 16) is engraved using the apparatus and method of the present invention. Notice the horizontal lines X1 and Y1 (as viewed in FIG. 16) exhibit improved placement of engraved areas achieved by the shifting of an engraved area or a portion thereof away from locations such as X2 which would be required by traditional engraving techniques.

The invention further provides tuning means, tuning processor, tuner or a tuning system 52 (FIG. 2) and method for calibrating and tuning the engraving head 28 such that it will track the generated toolpath in a desired or accurate manner. The tuner 52 is coupled to the engraving head 28 via amplifier 53 which amplifies the engraving signal received from tuner 52 for moving energizing stylus 30 on engraving head 28.

FIG. 9 illustrates a raw engraving head response characteristic 53 showing a plurality of peaks, such as peaks 53a and 53b, associated with a first resonance and a second resonance, respectively, of engraving head 28. As is conventionally known, the first and second resonances typically occur around 1800 KHz and about 5500 KHz, respectively, for a typical engraving head 28. As is also conventionally known and as shown in FIG. 10, a typical engraving system comprises a plurality of notch filters situated on the engraving head 28 which eliminate the aforementioned first and second resonances to provide a response characteristic 57 which is generally smooth, but substantially continuously decreasing, as shown in FIG. 10.

Advantageously, the apparatus and method of the present invention comprises emphasis filtering means or an emphasis filter 56 for processing the engraving signal to provide a substantially constant gain or linear response characteristic of the type shown by the response characteristic 58 in FIG. 11. Notice that the response characteristic 58 is substantially linear across a greater frequency range to provide a substantially constant gain for frequencies approaching or less than about 10,000 KHz. In general, the apparatus and method of the present invention achieves the foregoing by boosting the engraving signal at frequencies in excess of an emphasis frequency which in the embodiment being described is at least 1 KHz.

To achieve the response characteristic of the type shown in FIG. 11, tuning means 52 comprises at least one or a plurality filters 54 and 56 which processes or filters the toolpath (such as toolpath 64 in FIG. 3) generated by the digital signal processor 42. Once the notch filters 54 process the toolpath 64 to eliminate the first and second resonances mentioned above, the emphasis filter 56 is applied to filter the signal to provide the response characteristic 58 shown in FIG. 11.

In the embodiment being described, the notch filtering may be achieved by a single infinite impulse response filter algorithm implemented on a digital signal processor such as an ADSP21062 available from Analog Devices, Inc. of One Technology Way, P.O. Box 9106, Norwood, Mass. 02062. A second infinite impulse of response filter may be provided to implement the emphasis filtering of the present invention. An algorithm which may be used to implement the notch and emphasis filtering achieved by filters 54 and 56 is the infinite impulse response (IIR) bi-quad filter as described in the analog devices *ADSP*-21000 *Application Handbook,* Volume 1, Section 4.2—IIR Filters, available from Analog Devices, Inc. of Norwood, Mass. and published in May, 1994.

It should be appreciated that once the notch filter 54 modifies the response curve with a desired response characteristic, then the emphasis filter 56 provides a substantially linear or flattened frequency response (response 58 in FIG. 11) such that the response of the engraving head 28 achieves the same amplitude across a larger frequency range. This is particularly beneficial when engraving or implementing double frequency engraved areas of the type shown and described above relative to FIG. 4 because the filtered engraving head 28 must achieve at least 50% of the maximum amplitude at, for example, a frequency of 10 KHz as shown.

In the embodiment being described, tuning means 52 further comprises a tuning computer, interface means or a user interface 150 (FIG. 2) for configuring both notch filter 54 and the emphasis filter 56. This interface 150 may comprise an IBM or IBM compatible PC running application software which generates an interactive interface screen 150a (FIG. 12). In this regard, the user interface screen 150a may comprise a window 150b for inputting and/or adjusting parameters for the notch filters 54 and emphasis filter 56. In the embodiment being described, the filter parameters comprises a frequency value 152 and a notch depth value 154 for each of the notch filters 54. A similar user interface screen (not shown) is also provided for similar filter parameters values for emphasis filter 56. In the embodiment being described, the user interface 150 (FIG. 2) converts the parameter information into filter coefficients using the following coefficient formulas:

$$C_1 = 2\text{COS}\left(0.000005 * 2 * \Pi * FREQ * \sqrt{1 - DAMP^2}\right) *$$
$$e^{(-0.000005 * 2 * \Pi * FREQ * DAMP)}$$

$$C_2 = (e^{(-0.000005 * 2 * \Pi * FREQ * Damp)})^2$$

Where "$C_1$" and "$C_2$" are the IIR filter coefficients used by filter 54 and 56, respectively;

"FREQ" is the frequency value input by the user via user interface 150 (FIG. 2); and "DAMP" is the filter 54 and 56 damping value input by the user via user interface 150.

"$\pi$" is the universal constant 3.14159 . . .

The calculated coefficients $C_1$ and $C_2$ are then used to electronically set or adjust the actual coefficients of the notch filters 150 and 152.

Advantageously, this invention provides means for permitting a user to interactively program or adjust the filter coefficient values, thereby permitting the user to electronically program or change the frequency characteristic of the engraving head 28, without changing the hardware, such as the filters, associated with the engraving head 28.

The engraving system 10 further comprises a digital closed-loop feedback means or feedback controller 156 (FIG. 2) which assists in achieving a stable engraving head 28 by implementing electronic dampening of the natural resonances of the engraving head 28. In the embodiment being described, the feedback controller 156 is coupled to a sensing circuit 158 (FIG. 14) which senses and feeds a position of stylus 30 and a stylus 30 velocity to the feedback controller 156 (FIG. 2).

In this regard, FIG. 13 shows a sectional view of a typical armature 170 which is rigidly secured to a shaft 172 and projects outwardly between a pair of electromagnets 174 which are mounted within a base of the engraving head 28, as taught for example in U.S. Pat. Nos. 5,029,011; 4,450,486; 4,438,460; and 4,357,633 all of which are assigned to the same assignee as the present invention and incorporated herein by reference and made a part hereof. The armature 170 cooperates with the electromagnets 174 to define air gaps 176. In a manner conventionally known, when the electromagnets 174 are energized by an alternating current, the armature 170 and shaft oscillates to a maximum arc of approximately 0.25 degree and at a frequency of, for example, between 3–5 KHz. In a manner also conventionally known, the stylus is secured to the shaft 172 via a support arm (not shown), and consequently, oscillates in response to the oscillation of the shaft 172.

Energization of the electromagnets 174 is achieved in a conventional manner using the windings 178.

The sensing circuit 158 comprises a second set of windings 180 around electromagnets 174. In the embodiment being described, the windings 180 comprise a sensing coil for measuring the magnetic flux present in the electromagnet of the armature 170 which the feedback controller/means 156 uses to convert into an actual position of the stylus 30. The magnetic flux present in the electromagnet is the sum of two sources, the drive windings 178 and the flux induced due to the motion of the armature. Windings 180 detect the magnetic flux present in the motor and an electronic circuit (158 in FIG. 14) subtracts the flux due to the windings 178 to yield the component of the flux due to the velocity of the armature 170.

The means or circuit 158 comprises a current sensing resistor 182 which is situated between ground and a low (−) side of engraving head 28 as shown. The circuit 158 also comprises a receiver amplifier 184 which is coupled to a head drive high (+) winding 178A (FIG. 13) and head drive low (−) winding 178B to provide an amplified signal which is integrated by integrating amplifier 186. The resulting integrated signal is transmitted as one input to a summing amplifier 188 as shown in FIG. 14.

The circuit 158 also comprises receiving amplifier 190 is coupled to a head sense high (+) side 180A in FIG. 13 and a head sense low (−) (180B in FIG. 13) and across current sensor resistor 182 (FIG. 14) as shown. The receiving amplifier 190 receives the measured signals and generates an amplified output signal which is received as a second input by summing amplifier 188 and the sole input of a differentiator amplifier 192 as shown.

The outputs of differentiator amplifier 192 and receiving amplifier 184 is received by summing amplifier 194. Summing amplifiers 188 and 194 each sum their respective inputs received and generate or output a position signal and velocity signal, respectively. It has been found that the position signal and velocity signal correlate with the position and velocity of the armature 170 and stylus 30.

These sensed signals are fed back to a user interface decoder 154 (FIG. 2). The interface decoder 154 provides engraving head 28 response data to the user via the user interface 150 in the manner described earlier herein.

The system and method of the invention comprise means for providing interactive and automated tuning of engraving head 28 which will now be described relative to FIGS. 7 and 8 The routine begins at block 200 where tuning processor 52 receives the most recently transmitted value for toolpath 64 from toolpath controller 42. The routine proceeds to block 202 where the toolpath value is processed by notch filter 54 using the tuning filter coefficients generated by user interface 150 using predetermined coefficients or filter coefficients generated in response to parameters input by a user via user interface 150.

At block 204, the routine further processes the toolpath value with emphasis filter 56 using the emphasis filter coefficients input via user interface 150 using predetermined coefficients or filter coefficients generated in response to parameters input by a user via user interface 150.

At decision block 206, it is determined whether a user has input a tuning parameter update command by inputting a new or different parameter using user interface 150a in which case the new filter coefficients for the filter 54 generated by the user interface 150 are stored (block 209 in FIG. 7) by the tuning processor 52 in an appropriate buffer (not shown).

If the decision at decision block 206 is negative, then the routine proceeds to block 208 where it is determined whether a user has input new emphasis filter parameters, thereby indicating an emphasis filter 56 update command. If it does, then the routine proceeds to block 210 where new emphasis filter coefficients generated by user interface 150 are stored by tuning processor 140 in a suitable buffer (not shown).

If the decision at decision block 208 is negative, then the routine proceeds to decision block 212 where it is determined whether a head response test command has been received by interface decoder 154 from user interface 150. If it has, then the routine proceeds to test the engraving head 28 using a test pattern which is sent to the engraving head 28. During such testing, the feedback controller/means 156 generates feedback or sensed information regarding the actual position and velocity of stylus 30 in the manner described earlier herein. The sensed position and velocity data are fed back to the interface decoder 154 and ultimately to user interface 150 in a manner described later relative to FIG. 8.

If the decision at decision block 212 is negative or following blocks 209, 210 and 214, then the routine is complete.

FIG. 8 illustrates the interactive/automated tuning user interface means or routine which begins at block 220 where information is input by a user via the user interface 150. In the embodiment being described, such information may include, for example, an automatic tuning request, filter parameter information, such as filter notch depth, filter frequency change requests and/or a head response request command mentioned above for ascertaining the responsiveness of engraving head 28. In this regard, user interface screen 150a may comprise electronic buttons (not shown) for permitting an operator to select or input these various commands.

The routine proceeds to decision block 222 where it is determined if a user has input a request to change a frequency or notch depth of filter 54. If it has, then the routine proceeds to block 224 where the user interface computer 150 recomputes filter coefficients for the filter 54 and sends it to tuning processor 52 and then exits. As mentioned earlier herein, FIG. 12 shows one suitable user interface 150a for permitting the user to input such information.

If the decision at decision block 222 is negative, then the routine proceeds to block 226 where it is determined whether the emphasis filter 56 frequency change has been requested by the user. If it has, then the routine proceeds to block 228 where user interface 150 recomputes the filter coefficients in response to the new frequency input by the user and sends it to tuning processor 52 and then exits. Following the recomputations of the filter coefficients for filters 54 and 56, interface 150 sends the new notch filter coefficients and emphasis filter coefficients to the notch filters 54 and emphasis filter 56 in order to electronically adjust the filters 54 and 56 in response thereto as described earlier herein.

If the decision at decision block 226 is negative, then the routine proceeds to decision block 230 where it is determined if the user has input an automatic tuning request. If it has, then the interface decoder 154 sends the command to perform a head response test to the feedback controller/means 156 (block 232). At this point, tuning processor 52 stops processing actual toolpath data received on line 52a from toolpath controller 44 and begins processing test pattern data stored in memory of tuning processor 52.

Following engraving of the test pattern, feedback controller\means 156 receives sensed and actual position of stylus 30, as sensed by sensors 158 (FIG. 14) in the manner described earlier herein. This information is transmitted back to the decoder 154 and to user interface computer 150 for display and evaluation (block 234).

If the user interface computer 150 determines that an unacceptable difference of actual stylus 30 response and desired stylus 30 response exists, then the user interface computer 150 electronically recomputes and adjusts the filter coefficients $C_1$ and $C_2$ in response thereto (block 236).

Advantageously, it should be appreciated that this invention provides means and methods for automatically tuning an engraving head 28 in response to an automatic tuning request initiated by a user.

At block 238, new and/or adjusted filter coefficients are sent to filters 54 and 56, thereby automatically adjusting the response characteristic 58 (FIG. 11). After block 238 or if the decision at decision block 230 is negative, the routine terminates.

FIG. 15 provides a schematic illustration of an overall method of operation which begins on system power-up which, in turn, starts the toolpath controller 44 (block 240), tuning processor 140 (block 242) and interactive/automated tuning computer 150 (block 244). At decision block 246, it is determined if a user has input a tuning modification request and if he has not, then the routine loops back as shown (decision block 246). If the decision at decision block 246 is yes, then the routine proceeds to block 248 where the user interface routine (described relative to FIG. 8) is performed. Thereafter, the routine loops back to decision block 246 as shown.

Tuning processor 52 comprises an internal clock or timer (not shown) which is timed to periodically expire 200,000 times per second. At decision block 250, if it is determined that the timer has expired, then the routine proceeds to block 252 where the tuning processor routine described relative to FIG. 7 is performed. Thereafter or if the decision at decision block 250 is negative, the routine loops back to decision block 250 as shown.

At decision block 254, it is determined whether a machine synchronization signal (not shown) has been received by digital signal processor 42 from engraving controller 38. If it has, then the toolpath controller synchronization routine described above relative to FIG. 6 is performed. Thereafter or if the decision at decision block 254 is negative, the routine loops back to block 254 as shown.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for controlling a path of a tool in an engraver comprising the steps of:
   generating image data corresponding to an image to be engraved, said image data corresponding to density values associated with said image;
   generating control points in response to said image data;
   processing said control points to define a toolpath; and
   driving said tool to engrave a workpiece in response to said toolpath.

2. A method for controlling a path of a tool in an engraver comprising the steps of:
   generating image data corresponding to an image to be engraved;
   generating control points in response to said image data;
   processing said control points to define a toolpath; and
   driving said tool to engrave a workpiece in response to said toolpath;
   wherein said processing step further comprises the steps of:
   processing said image data to provide a predetermined number of density values;
   using said predetermined number of density values to determine a total percentage image density.

3. The method for controlling as recited in claim 2 wherein said method further comprises the step of:
   using said predetermined number of density values to determine a density center.

4. A method for controlling a path of a tool in an engraver comprising the steps of:
   generating image data corresponding to an image to be engraved;
   generating control points in response to said image data;
   processing said control points to define a toolpath; and
   driving said tool to engrave a workpiece in response to said toolpath;
   wherein said method further comprises the steps of:
   identifying an entry control point where said tool enters said workpiece;
   identifying an exit control point wherein said tool exits said workpiece;
   identifying at least one other control point between said entry control point and said exit control point.

5. The method for controlling as recited in claim 4 wherein said method further comprises the step of:
   identifying a center control point between said entry control point and said exit control point;
   using said entry control point, said exit control point and said center control point to define said toolpath.

6. A method for controlling a path of a tool in an engraver comprising the steps of:
   generating image data corresponding to an image to be engraved;
   generating control points in response to said image data;
   processing said control points to define a toolpath; and
   driving said tool to engrave a workpiece in response to said toolpath;
   wherein said method further comprises the steps of:
   identifying a center control point between an entry control point and an exit control point;
   fitting said entry control point, said exit control point and said center control point with a curve to define said toolpath.

7. The method for controlling as recited in claim 6 wherein said method further comprises the step of:
   identifying a center control point corresponding to a center of an image density.

8. The method for controlling as recited in claim 4 wherein said method further comprises the step of:
   determining a total percentage image density for said image data;
   using said total percentage image density to establish said entry control point and said exit control point.

9. A method for controlling a path of a tool in an engraver comprising the steps of:
   generating image data corresponding to an image to be engraved;
   generating control points in response to said image data;
   processing said control points to define a toolpath; and
   driving said tool to engrave a workpiece in response to said toolpath;
   wherein said method further comprises the step of:
   establishing an entry control point and an exit control point at a surface of said workpiece.

10. The method for controlling as recited in claim 7 wherein said method further comprises the step of:
    positioning said entry control point and said exit control point about said center control point.

11. The method for controlling as recited in claim 8 wherein said method further comprises the step of:
    establishing said entry control point and said exit control point below a surface of said workpiece if said total percentage density exceeds a predetermined percentage.

12. The method as recited in claim 11 wherein said predetermined percentage is at least 90%.

13. A method for controlling a path of a tool in an engraver comprising the steps of:
    generating image data corresponding to an image to be engraved;
    generating control points in response to said image data;
    processing said control points to define a toolpath; and
    driving said tool to engrave a workpiece in response to said toolpath;
    wherein said image data comprises first image data and second image data, said method further comprising the steps of:
    determining if a summed image density for said first image data and said second image data comprises a majority of the density for all of the image data;
    separating said first image data and said second image data into a first image data subset and a second image data subset;
    generating control points for each of said first image data subset and said second image data subset.

14. A method for controlling a path of a tool in an engraver comprising the steps of:
    generating image data corresponding to an image to be engraved;
    generating control points in response to said image data;
    processing said control points to define a toolpath; and
    driving said tool to engrave a workpiece in response to said toolpath;
    wherein said image data comprises a plurality of image data sets, said method further comprising the steps of:
    determining if a summed density for said plurality of image data sets comprises a majority of the density for all of the image data;

separating said plurality of image data sets into a plurality of image data subsets;

generating control points for each of said image data subsets.

15. The method as recited in claim 6 wherein said fitting step further comprises the step of:

using a cubic spline interpolation routine during said fitting step.

16. The method as recited in claim 6 wherein said method further comprises the steps of:

determining a frequency of image data values to represent an engraved area to be engraved on said workpiece to provide a predetermined number of density values;

determining a total percentage image density using said predetermined number of density values.

17. The method as recited in claim 16 wherein said method further comprises the step of:

identifying an entry control point, an exit control point and a third control point between said entry and exit control points;

using said entry control point, said exit control point and said third control point to define said toolpath.

18. The method for controlling as recited in claim 17 wherein said method further comprises the step of:

identifying a center control point corresponding to a center of an image density.

19. The method for controlling as recited in claim 18 wherein said method further comprises the step of:

establishing said entry control point and said exit control point below a surface of said workpiece if said total percentage density exceeds a predetermined percentage.

20. The method as recited in claim 19 wherein said predetermined percentage is at least 90%.

21. A method for controlling a path of a tool in an engraver comprising the steps of:

generating image data corresponding to an image to be engraved;

generating control points in response to said image data;

processing said control points to define a toolpath; and driving said tool to engrave a workpiece in response to said toolpath;

wherein said method further comprises the steps of:

determining whether said image data is continuous tone data or line-work data;

generate either a continuous tone scaler or a line-work scaler if it is determined that said image data is continuous tone data or line-work data, respectively;

applying either said continuous tone scaler or said line-work scaler to said control points prior to said processing step.

22. A method for engraving a workpiece with a pattern of engraved areas on a workpiece comprising the steps of:

generating image data corresponding to an image to be engraved, said image data corresponding to density values associated with said image;

deriving a toolpath directly from said image data;

using said toolpath to determine an engraving signal; and energizing an engraving head to engrave said workpiece using said engraving signal.

23. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the step of:

generating a plurality of control points corresponding to said image data.

24. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the steps of:

generating control points corresponding to said image data;

fitting said control points with a curve to generate said toolpath.

25. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the step of:

performing said deriving step using a cubic spline interpolation routine.

26. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the steps of:

processing said image data to provide a predetermined number of density values;

using said predetermined number of density values to determine a total percentage image density.

27. The method as recited in claim 26 wherein said method further comprises the step of:

using said predetermined number of density values to determine a density center.

28. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the steps of:

identifying an entry control point where a tool on said engraving head enters said workpiece;

identifying an exit control point where a tool on said engraving head exits said workpiece;

identifying at least one other control point between said entry control point and said exit control point.

29. The method for controlling as recited in claim 28 wherein said method further comprises the step of:

identifying a center control point between said entry control point and said exit control point;

using said entry control point, said exit control point and said center control point to define said toolpath.

30. The method for controlling as recited in claim 28 wherein said method further comprises the step of:

identifying a center control point between said entry control point and said exit control point;

fitting said entry control point, said exit control point and said center control point with a curve to define said toolpath.

31. The method for controlling as recited in claim 30 wherein said method further comprises the step of:

identifying a center control point corresponding to a center of an image density.

32. The method for controlling as recited in claim 28 wherein said method further comprises the step of:

determining a total percentage image density for a portion of said image data, said portion corresponding to an engraved area to be engraved;

using said total percentage image density to establish said entry control point and said exit control point.

33. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal, wherein said method further comprises the step of:

establishing said entry control point and said exit control point at a surface of said workpiece.

34. The method for controlling as recited in claim 28 wherein said method further comprises the step of:

establishing said entry control point and said exit control point below a surface of said workpiece if said total percentage density exceeds a predetermined percentage.

35. The method as recited in claim 34 wherein said predetermined percentage is at least 90%.

36. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said image data comprises first image data and second image data, said method further comprising the steps of:

determining if a summed image density for said first image data and said second image data comprises a majority of the density for all of the image data;

separating said first image data and said second image data into a first image data subset and a second image data subset;

generating control points for each of said first image data subset and said second image data subset.

37. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said image data comprises a plurality of image data sets, said method further comprising the steps of:

determining if a summed density for said plurality of image data sets is greater than a density for all of the image data;

separating said plurality of image data sets into a plurality of image data subsets;

generating control points for each of said plurality of image data subsets.

38. A method for engraving a workpiece with a pattern of engraved areas on a workpiece comprising the steps of:

generating image data corresponding to an image to be engraved;

deriving a toolpath directly from said image data;

using said toolpath to determine an engraving signal; and energizing an engraving head to engrave said workpiece using said engraving signal;

wherein said method further comprises the steps of:

determining a frequency of image data values to represent at least a portion of said image to be engraved on said workpiece to provide a predetermined number of image density values;

generating a plurality of control points using said predetermined number of image density values.

39. A toolpath controller for controlling a path of a tool on an engraving head in an engraver comprising:

an image data processor for generating control points in response to said image data of density values associated with an image to be engraved, said image data processor further comprising a toolpath generator for processing said control points to define a toolpath; and a signal generator coupled to said image data processor and to said engraving head for receiving said toolpath and for energizing engraving head to drive said tool to engrave a workpiece in response to said toolpath.

40. A toolpath controller for controlling a path of a tool on an engraving head in an engraver comprising:

an image data processor for generating control points in response to said image data, said image data processor further comprising a toolpath generator for processing said control points to define a toolpath; and a signal generator coupled to said image data processor and to said engraving head for receiving said toolpath and for energizing engraving head to drive said tool to engrave a workpiece in response to said toolpath;

wherein said image data processor processes said image data to provide a predetermined number of density values, said image data processor further comprising:

an image density determiner for receiving said predetermined number of density values and for determining a total percentage image density.

41. A toolpath controller for controlling a path of a tool on an engraving head in an engraver comprising:

an image data processor for generating control points in response to said image data, said image data processor further comprising a toolpath generator for processing said control points to define a toolpath; and a signal generator coupled to said image data processor and to said engraving head for receiving said toolpath and for energizing engraving head to drive said tool to engrave a workpiece in response to said toolpath;

wherein said toolpath controller further comprises:

density center determining means for receiving said predetermined number of density values and for using said predetermined number of density values to determine a density center.

42. A toolpath controller for controlling a path of a tool on an engraving head in an engraver comprising:

an image data processor for generating control points in response to said image data, said image data processor further comprising a toolpath generator for processing said control points to define a toolpath; and a signal generator coupled to said image data processor and to said engraving head for receiving said toolpath and for energizing engraving head to drive said tool to engrave a workpiece in response to said toolpath;

wherein said toolpath generator further comprises:

a control point generator for identifying an entry control point where said tool enters said workpiece, an exit control point wherein said tool exits said workpiece, and at least one other control point between said entry control point and said exit control point.

43. The toolpath controller for controlling as recited in claim 42 wherein said control point generator further comprises:

a center point identifier for identifying a center control point between said entry control point and said exit control point;

said toolpath controller being capable of generating said toolpath in response to said entry control point, said exit control point and said center control point to define said toolpath.

44. The toolpath controller for controlling as recited in claim 42 wherein said image data processor further comprises:

a curve fitter for receiving said entry control point, said exit control point and said at least one other control point and for generating a curve corresponding thereto.

45. The toolpath controller for controlling as recited in claim 42 wherein said image data processor receives said image data and determines a total percentage image density therefor and uses said total percentage image density to establish said entry control point and said exit control point.

46. The toolpath controller for controlling as recited in claim 42 wherein said toolpath generator establishes said entry control point and said exit control point at a surface of said workpiece upon the occurrence of a predetermined condition.

47. The toolpath controller for controlling as recited in claim 46 wherein said predetermined condition comprises a density being less than a predetermined density.

48. The toolpath controller for controlling as recited in claim 47 wherein said predetermined density is less than 90%.

49. A toolpath controller for controlling a path of a tool on an engraving head in an engraver comprising:

an image data processor for generating control points in response to said image data, said image data processor further comprising a toolpath generator for processing said control points to define a toolpath; and a signal generator coupled to said image data processor and to said engraving head for receiving said toolpath and for energizing engraving head to drive said tool to engrave a workpiece in response to said toolpath;

wherein said image data comprises first image data and second image data, said toolpath controller further comprising:

a double frequency determiner for determining if a summed image density for said first image data and said second image data comprises a majority of the density for all of the image data;

said double frequency determiner separating said first image data and said second image data into a first image data subset and a second image data subset if said image density exceeds a majority and generating control points for each of said first image data subset and said second image data subset.

50. The toolpath controller as recited in claim 44 wherein said curve fitter further comprises:

a cubic spline interpolation routine for generating said tool curve.

* * * * *